(12) United States Patent
Klasen-Memmer et al.

(10) Patent No.: US 7,371,437 B2
(45) Date of Patent: May 13, 2008

(54) LIQUID-CRYSTALLINE MEDIUM

(75) Inventors: Melanie Klasen-Memmer, Heuchhelheim (DE); Matthias Bremer, Darmstadt (DE); Barbara Hornung, Hasselroth (DE); Wolfgang Schmidt, Dreieich (DE); Rainer Wingen, Hofheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/500,505

(22) Filed: Aug. 8, 2006

(65) Prior Publication Data

US 2007/0051920 A1    Mar. 8, 2007

(30) Foreign Application Priority Data

Aug. 9, 2005   (DE) .................. 10 2005 038 039

(51) Int. Cl.
*C09K 19/34*  (2006.01)
*C09K 19/32*  (2006.01)
*C09K 19/30*  (2006.01)
*C09K 19/12*  (2006.01)
*C09K 19/20*  (2006.01)

(52) U.S. Cl. ............. 428/1.1; 252/299.01; 252/299.61; 252/299.62; 252/299.63; 252/299.66; 252/299.67

(58) Field of Classification Search ................ 428/1.1; 252/299.61, 299.62, 299.63, 299.01, 299.66, 252/299.67
See application file for complete search history.

(56) References Cited

U.S. PATENT DOCUMENTS 7,018,685 B2    3/2006  Schmidt
2004/0124399 A1*  7/2004  Schmidt et al. ........ 252/299.62

FOREIGN PATENT DOCUMENTS

DE        10101022    *  7/2002

\* cited by examiner

*Primary Examiner*—Shean C Wu
(74) *Attorney, Agent, or Firm*—Millen, White, Zelano & Branigan, PC

(57) ABSTRACT

A liquid-crystalline medium based on a mixture of polar compounds having at least one compound of the formula I

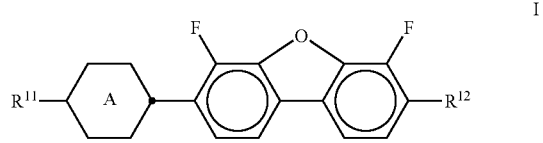

in which $R^{11}$, $R^{12}$ and

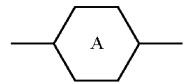

have the meanings indicated in claim 1, is described. Also described is the use thereof for an active-matrix display based on the VA, ECB, PALC, FFS or IPS effect.

22 Claims, No Drawings

LIQUID-CRYSTALLINE MEDIUM

The invention relates to a liquid-crystalline medium based on a mixture of polar compounds which comprises at least one compound of the formula I

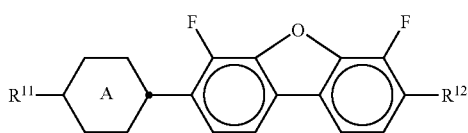

in which
R$^{11}$ and R$^{12}$ each, independently of one another, denote H, an alkyl or alkenyl radical having up to 15 C atoms which is unsubstituted, monosubstituted by CN or CF$_3$ or at least mono-substituted by halogen, where, in addition, one or more CH$_2$ groups in these radicals may be replaced by —O—, —S—,

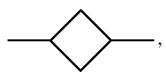

—C≡C—, —CF$_2$O—, —OCF$_2$—, —OC—O— or —O—CO— in such a way that O atoms are not linked directly to one another,

denotes
a) a 1,4-cyclohexenylene or 1,4-cyclohexylene radical, in which one or two non-adjacent CH$_2$ groups may be replaced by —O— or —S—,
b) a 1,4-phenylene radical, in which one or two CH groups may be replaced by N,
c) a radical from the group consisting of piperidine-1,4-diyl, 1,4-bicyclo[2.2.2]octylene, naphthalene-2,6-diyl, decahydronaphthalene-2,6-diyl, 1,2,3,4-tetrahydro-naphthalene-2,6-diyl, phenanthrene-2,7-diyl and fluorene-2,7-diyl, where the radicals a), b) and c) may be mono- or polysubstituted by halogen atoms, preferably one or two fluorine atoms.

Media of this type are to be used, in particular, for electro-optical displays with active-matrix addressing based on the ECB effect and for IPS (in-plane switching) displays. The medium according to the invention preferably has negative dielectric anisotropy.

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants K$_3$/K$_1$, high values for the optical anisotropy Δn and values for the dielectric anisotropy Δε of ≦−0.5 in order to be suitable for use for high-information display elements based on the ECB effect. Electro-optical display elements based on the ECB effect have a homeotropic edge alignment (VA technology=vertically aligned). Dielectrically negative liquid-crystal media can also be used in displays which use the so-called IPS effect.

Industrial application of this effect in electro-optical display elements requires LC phases which have to comply with a multiplicity of requirements. Particularly important here are chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as LC phases. However, it has not been possible to prepare optimum phases easily in this manner, since no liquid-crystal materials having significantly negative dielectric anisotropy and adequate long-term stability have hitherto been available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate.
2. Thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays disclosed hitherto usually operate as TN cells with crossed polarizers in transmission and are back-lit.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantages of the MLC-TN displays disclosed hitherto are their comparatively low contrast, the relatively high viewing-angle dependence and the difficulty of producing grey shades in these displays.

There thus continues to be a great demand for MLC displays having very high specific resistance at the same time as a wide operating-temperature range, short response times and low threshold voltage with the aid of which various grey shades can be produced.

The invention has an object of providing MLC displays, not only for monitor and TV applications, but also for mobile telephones and navigation systems, which are based on the ECB or IPS effect, do not have the disadvantages indicated above, or only do so to a lesser extent, and at the same time have very high specific resistance values. In particular, it must be ensured for mobile telephones and navigation systems that they also work at extremely high and extremely low temperatures.

Upon further study of the specification and appended claims, further objects and advantages of this invention will become apparent to those skilled in the art.

Surprisingly, it has now been found that these and other objects can be achieved if nematic liquid-crystal mixtures which comprise at least one compound of the formula I are used in these display elements.

The invention thus relates to a liquid-crystalline medium based on a mixture of polar compounds which comprises at least one compound of the formula I.

The mixtures according to the invention exhibit very broad nematic phase ranges with clearing points preferably ≧85° C., very favorable values for the capacitive threshold, relatively high values for the holding ratio and at the same time very good low-temperature stabilities at −30° C. and −40° C. as well as very low rotational viscosities. The mixtures according to the invention are furthermore distinguished by a good ratio of clearing point and rotational viscosity and a high negative dielectric anisotropy.

Some preferred embodiments of the mixtures according to the invention are shown below:
a) $R^{11}$ and/or $R^{12}$ in the compounds in the formula I preferably denote H, alkyl, alkenyl or alkoxy having up to 6 C atoms; $R^{11}$ and $R^{12}$ particularly preferably denote alkyl, where the alkyl radical may be identical or different. $R^{12}$ very particularly preferably denotes alkoxy or alkenyloxy.
b) Liquid-crystalline medium in which $R^{11}$ in formula I preferably has the following meanings: straight-chain alkyl, vinyl, 1E-alkenyl or 3-alkenyl.

If $R^1$ denotes alkenyl, it is preferably $CH_2$=CH, $CH_3$—CH=CH, $C_3H_7$—CH=CH, $CH_2$=CH—$C_2H_5$ or $CH_3$—CH=CH—$C_2H_5$.
c) Liquid-crystalline medium which comprises one, two, three, four or more, preferably one or two, compounds of the formula I.
d) Liquid-crystalline medium in which the proportion of compounds of the formula I in the mixture as a whole is at least 2% by weight, preferably at least 4% by weight, particularly preferably 2-20% by weight.
e) Liquid-crystalline medium which additionally comprises one or more compounds of the formulae IIA and/or IIB

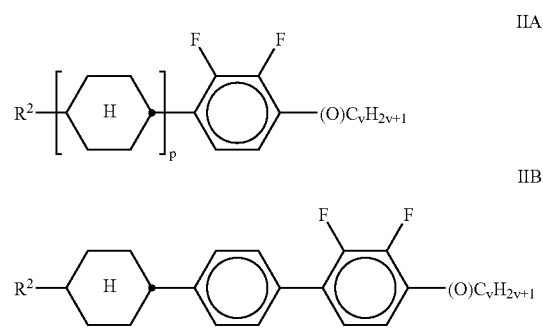

in which
$R^2$ has the meaning indicated for $R^{11}$,
p denotes 1 or 2, and
v denotes 1 to 6.
f) Liquid-crystalline medium which additionally comprises one or more compounds of the formula III

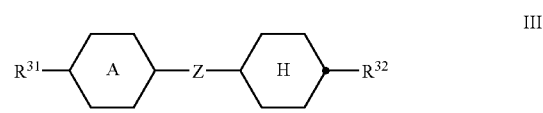

in which
$R^{31}$ and $R^{32}$ each, independently of one another, denote a straight-chain alkyl, alkenyl, alkoxyalkyl or alkoxy radical having up to 12 C atoms, and

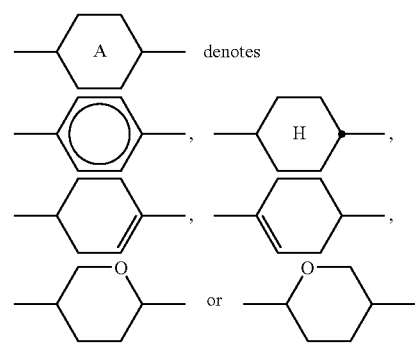

Z denotes a single bond, —$CH_2CH_2$—, —CH=CH—, —$CF_2O$—, —$OCF_2$—, —$CH_2O$—, —$OCH_2$—, —COO—, —OCO—, —$C_2F_4$— or —CF=CF—.

g) Liquid-crystalline medium in which the proportion of compounds of the formulae IIA and/or IIB in the mixture as a whole is at least 20% by weight.
h) Liquid-crystalline medium in which the proportion of the compounds of the formula IIII in the mixture as a whole is at least 5% by weight.
i) Liquid-crystalline medium which comprises at least one compound selected from the sub-formulae I1 to I9:

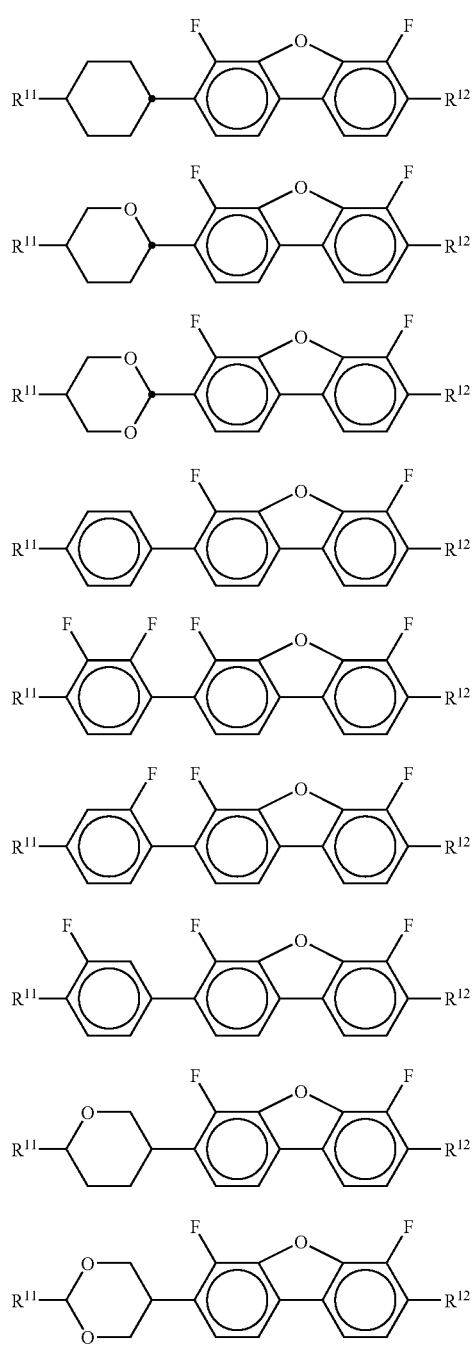

j) Liquid-crystalline medium which additionally comprises one or more compounds selected from the formulae IIIa to IIIj:

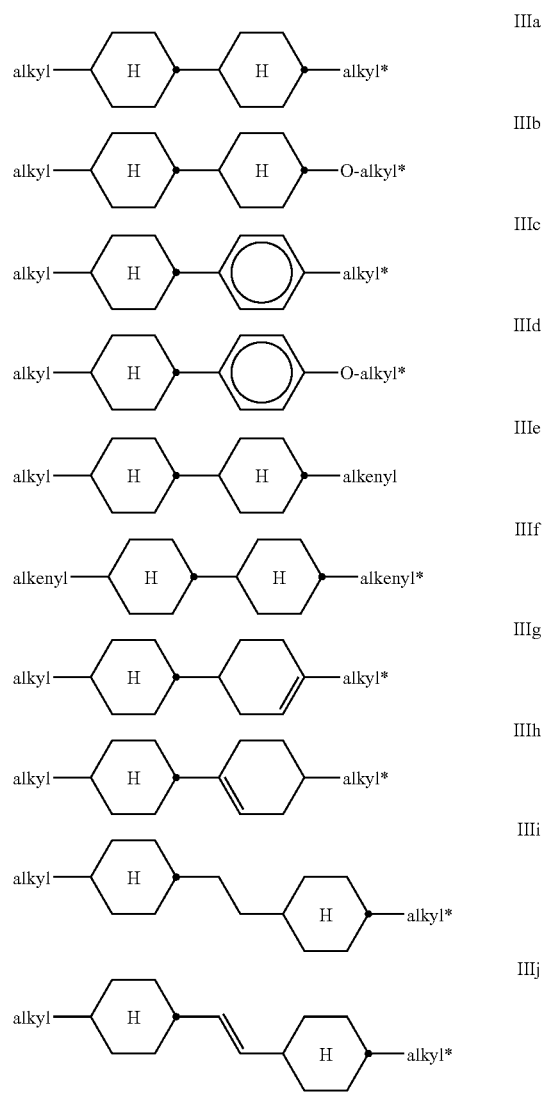

in which
alkyl and
alkyl* each, independently of one another, denote a straight-chain alkyl radical having 1-6 C atoms, and
alkenyl and
alkenyl* each, independently of one another, denote a straight-chain alkenyl radical having 2-6 C atoms.

The medium according to the invention preferably comprises at least one compound of the formulae IIIa, IIIb and/or IIIe.

Particularly preferred compounds of the formulae IIIe and IIIf are shown below:

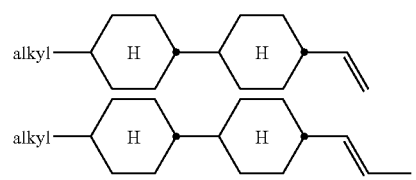

-continued

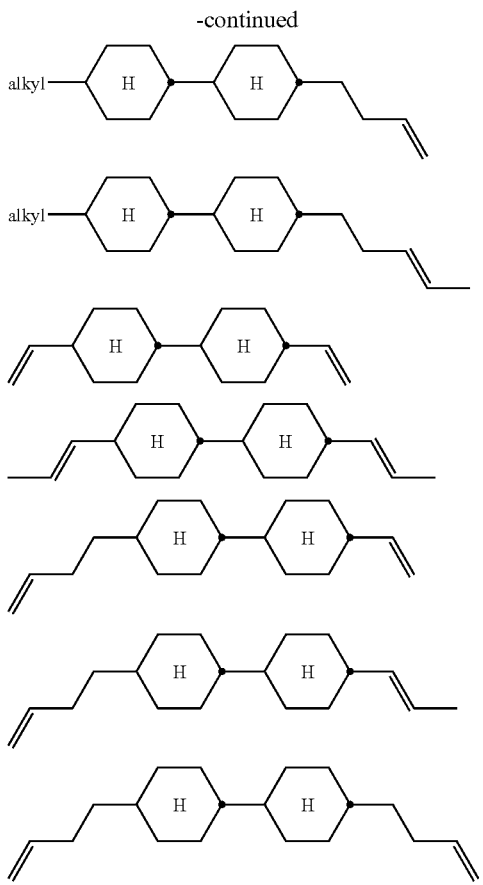

Particularly preferred media according to the invention comprise a compound of the formulae

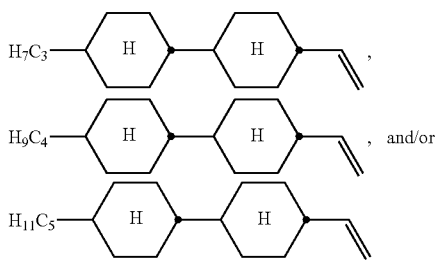

in amounts of 30-60% by weight, preferably 30-50% by weight.

k) Liquid-crystalline medium which comprises or consists of
2-20% by weight of one or more compounds of the formula I and
20-80% by weight of one or more compounds of the formulae IIA and/or IIB,
where the total amount of the compounds of the formulae I and IIA and/or IIB is ≦100% by weight.

l) Liquid-crystalline medium which additionally comprises one or more tetracyclic compounds of the formulae

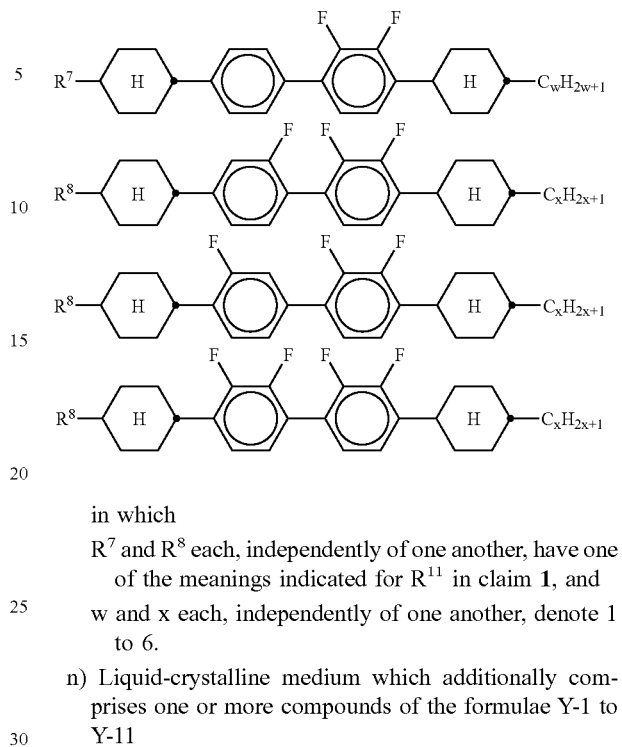

in which
R$^7$ and R$^8$ each, independently of one another, have one of the meanings indicated for R$^{11}$ in claim 1, and
w and x each, independently of one another, denote 1 to 6.

n) Liquid-crystalline medium which additionally comprises one or more compounds of the formulae Y-1 to Y-11

Y-1

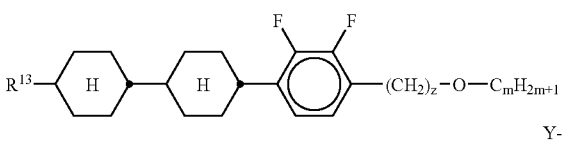

Y-2

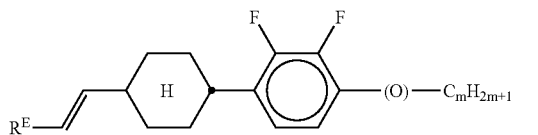

Y-3

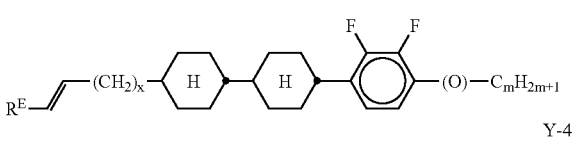

Y-4

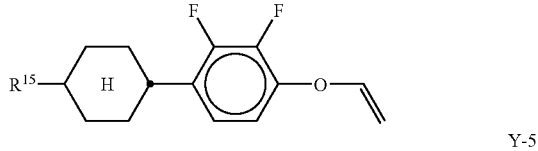

Y-5

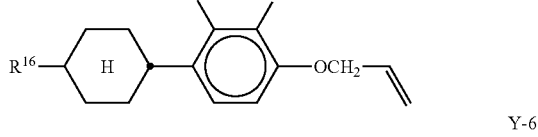

Y-6

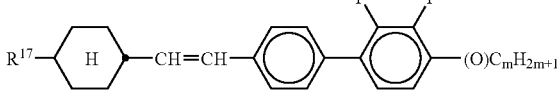

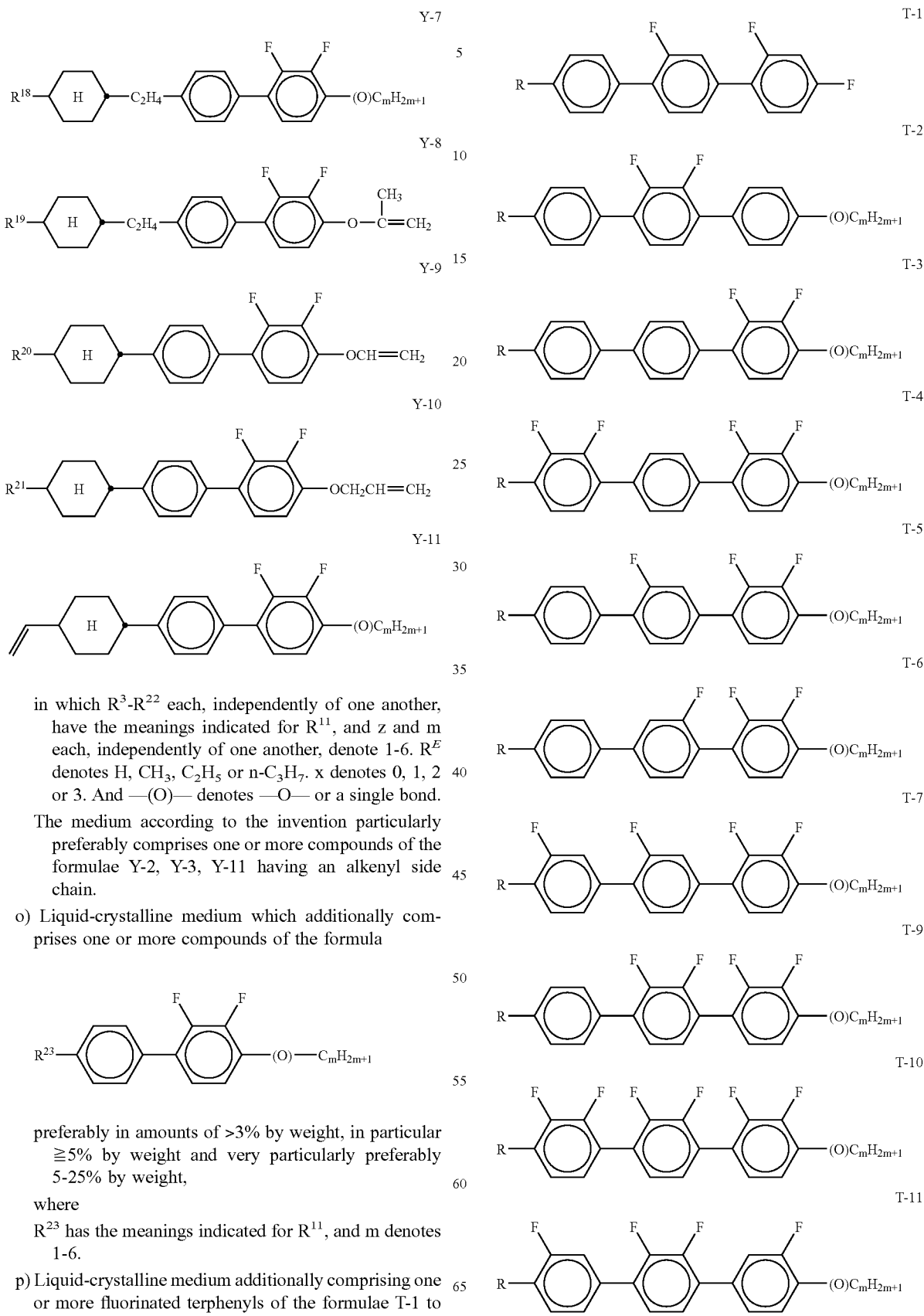

in which $R^3$-$R^{22}$ each, independently of one another, have the meanings indicated for $R^{11}$, and z and m each, independently of one another, denote 1-6. $R^E$ denotes H, $CH_3$, $C_2H_5$ or n-$C_3H_7$. x denotes 0, 1, 2 or 3. And —(O)— denotes —O— or a single bond.

The medium according to the invention particularly preferably comprises one or more compounds of the formulae Y-2, Y-3, Y-11 having an alkenyl side chain.

o) Liquid-crystalline medium which additionally comprises one or more compounds of the formula preferably in amounts of >3% by weight, in particular ≧5% by weight and very particularly preferably 5-25% by weight, where $R^{23}$ has the meanings indicated for $R^{11}$, and m denotes 1-6.

p) Liquid-crystalline medium additionally comprising one or more fluorinated terphenyls of the formulae T-1 to T-22

-continued

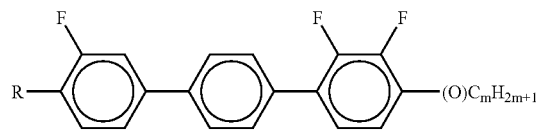
T-12

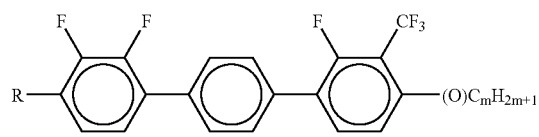
T-13

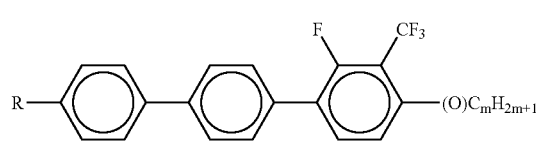
T-14

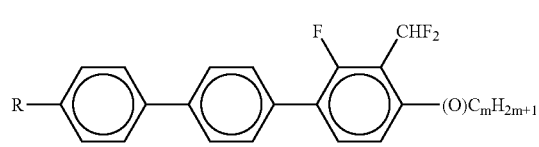
T-15

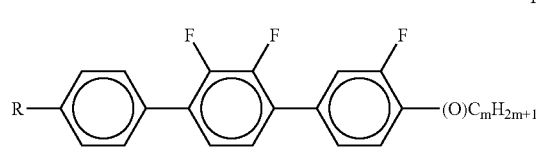
T-16

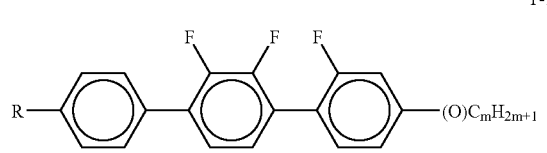
T-17

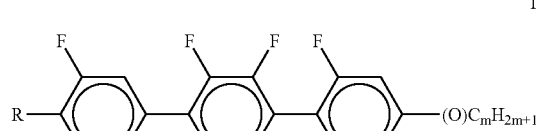
T-18

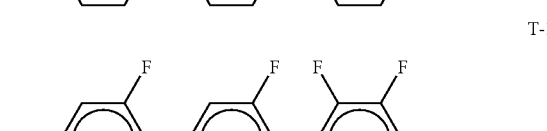
T-19

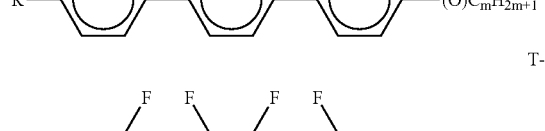
T-20

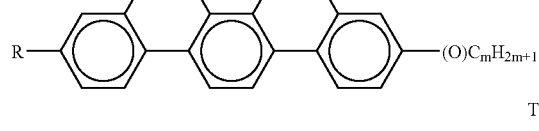
T-21

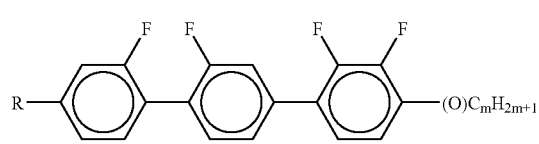

-continued

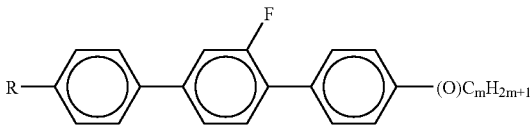
T-22 in which

R has the meanings indicated for $R^{11}$.

R is preferably straight-chain alkyl, alkoxy or alkoxyalkyl, in each case having 1-6 C atoms, alkenyl or alkenyloxy having 2-6 C atoms. R preferably denotes methyl, ethyl, propyl, butyl, pentyl, hexyl, methoxy, ethoxy, propoxy, butoxy or pentoxy.

The medium according to the invention preferably comprises the terphenyls of the formulae T-1 to T-22 in amounts of 2-30% by weight, in particular 5-20% by weight.

Particular preference is given to compounds of the formulae T-1, T-2, T-3 and T-22. In these compounds, R preferably denotes alkyl, furthermore alkoxy, in each case having 1-5 C atoms.

The terphenyls are preferably employed in mixtures having a $\Delta n \geqq 0.10$ in combination with the compounds of the formulae I, IIA, IIB and III. Preferred mixtures comprise 2-20% by weight of terphenyls and 5-60% by weight of the compounds of the formulae IIA and/or IIB.

q) Liquid-crystalline medium additionally comprising one or more biphenyls of the formulae B-1 to B-5

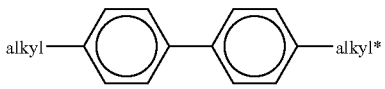
B-1

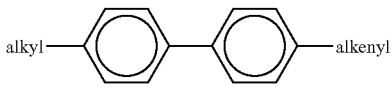
B-2

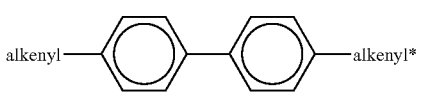
B-3

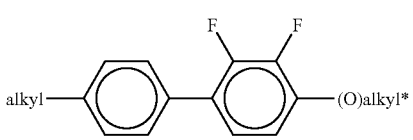
B-4

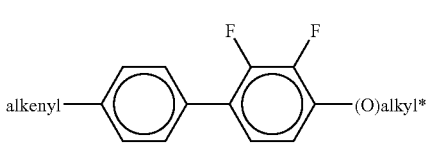
B-5 in which alkyl, alkyl*, alkenyl and alkenyl* have the meanings indicated above.

The proportion of the biphenyls of the formulae B-1 to B-5 in the mixture as a whole is preferably at least 3% by weight, in particular $\geqq 5\%$ by weight.

Of the compounds of the formulae B-1 to B-5, the compounds of the formulae B-1 and B-4 are particularly preferred.

Preferred biphenyls are likewise

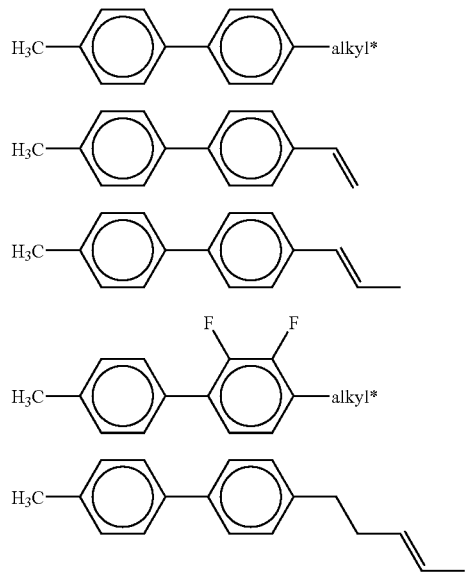

in which -alkyl* has the meaning indicated above. In particular, the medium according to the invention comprises one or more compounds from the group of the compounds of the formulae B-1a and/or B-2c.

r) Liquid-crystalline medium which additionally comprises one or more compounds of the formulae

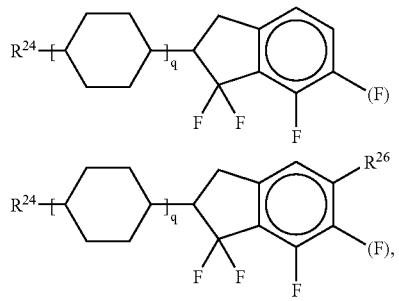

preferably in amounts of >3% by weight, in particular ≧5% by weight, and very particularly preferably 5-25% by weight,
where
$R^{24-25}$ have the meanings indicated for $R^{11}$, and $R^{26}$ denotes $CH_3$, $C_2H_5$ or n-$C_3H_7$, and q denotes 1 or 2.

s) Liquid-crystalline medium additionally comprising at least one compound of the formulae Z-1 to Z-21

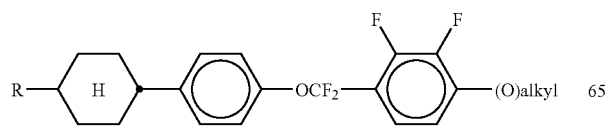

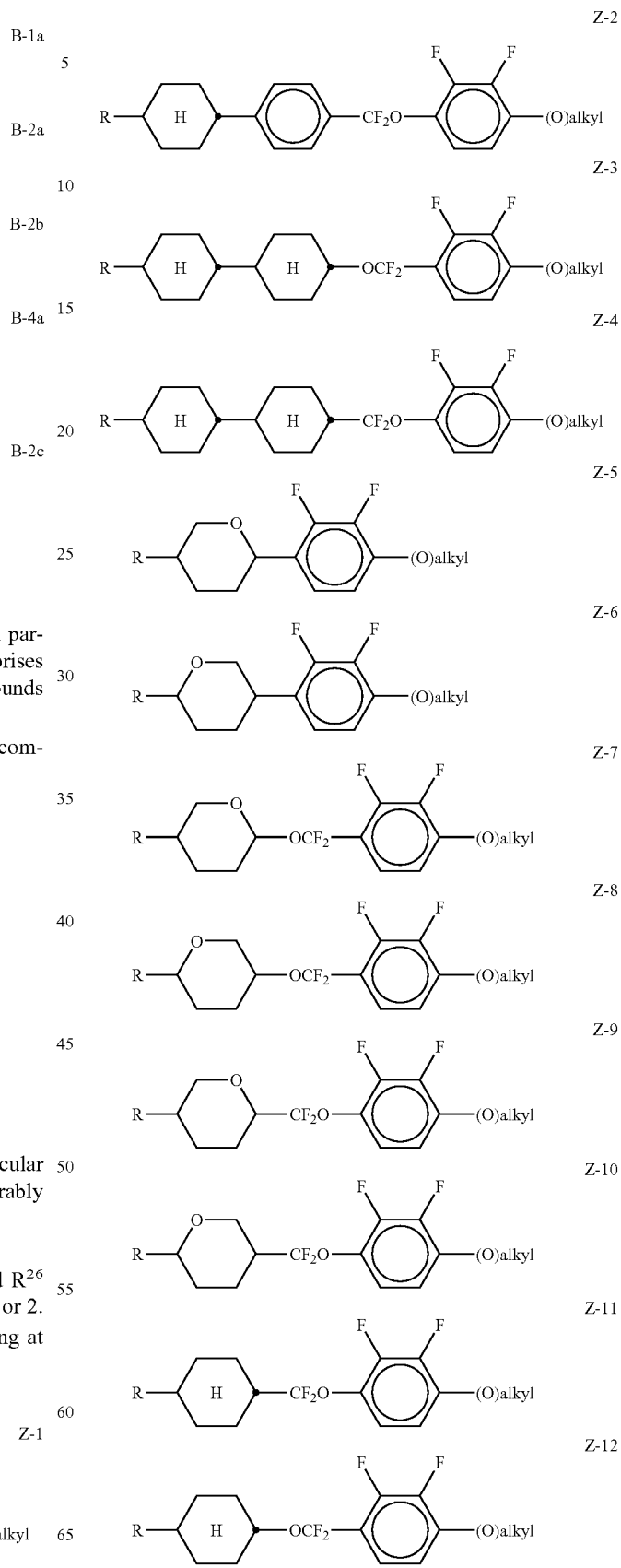

-continued

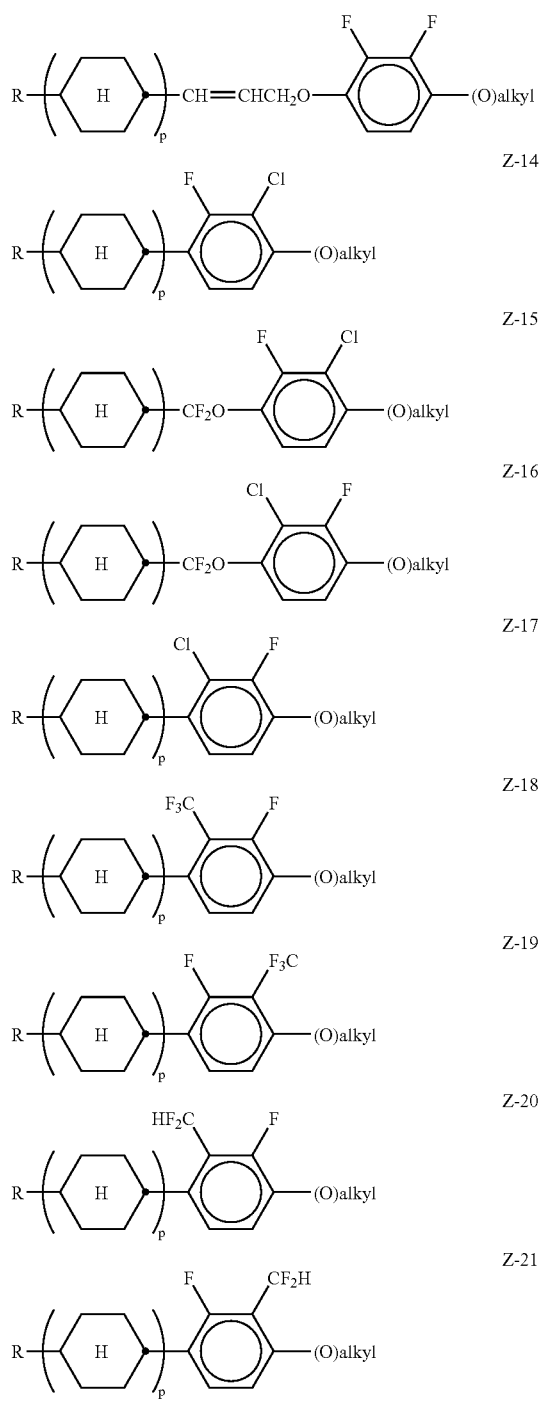

in which
R and alkyl have the meanings indicated above, and p is 1 or 2,
preferably in amounts of ≧5% by weight, in particular ≧10% by weight.
Particular preference is given to media which comprise one, two or more compounds of the formulae Z-1 to Z-13 and additionally one, two or more compounds of the formula II. Mixtures of this type preferably comprise ≧10% by weight of compounds of the formula II.

t) Liquid-crystalline medium comprising at least one compound of the formulae O-1 to O-12

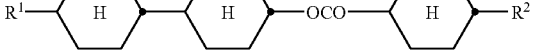

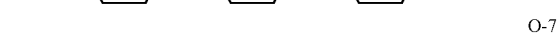

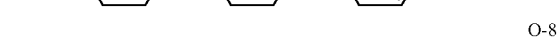

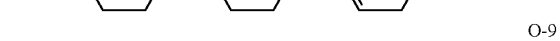

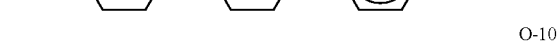

in which R¹ and R² have the meanings indicated for R¹¹, and R¹ and R² each, independently of one another, preferably denote straight-chain alkyl, furthermore alkenyl.

Preferred liquid-crystalline media according to the invention comprise one or more substances which contain a tetrahydronaphthyl or naphthyl unit, such as, for example, the compounds of the formulae N-1 to N-5

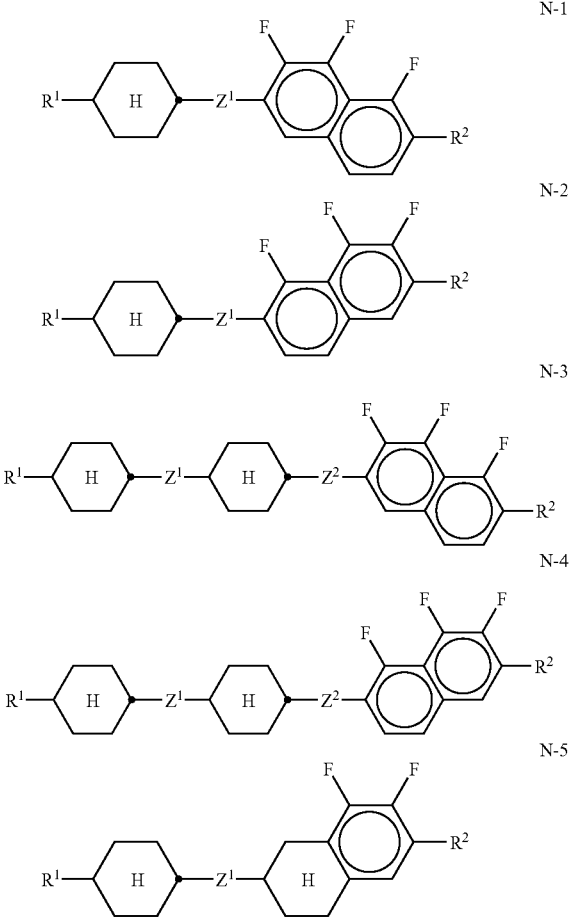

in which R¹ and R² each, independently of one another, have the meanings indicated for R¹¹, preferably denote straight-chain alkyl, straight-chain alkoxy or straight-chain alkenyl, and Z, Z¹ and Z² each, independently of one another, denote
—$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

The invention furthermore relates to an electro-optical display with active-matrix addressing based on the ECB effect, characterized in that it contains, as dielectric, a liquid-crystalline medium as described herein.

The liquid-crystal mixture preferably has a nematic phase range of at least 60 K and a flow viscosity $v_{20}$ of at most 30 mm² ·s⁻¹ at 20° C.

The liquid-crystal mixture according to the invention preferably has a Δε of −0.5 to −8.0, in particular −3.0 to −6.0, where Δε denotes the dielectric anisotropy. The rotational viscosity $\gamma_1$ is preferably <200 mPa·s, in particular <170 mPa·s.

The birefringence Δn in the liquid-crystal mixture is preferably between 0.07 and 0.16, preferably between 0.08 and 0.12.

The mixtures according to the invention are suitable for all VA-TFT applications, such as, for example, VAN, MVA, (S)-PVA and ASV. They are furthermore suitable for IPS (in-plane switching), FFS (fringe field switching) and PALC applications of negative Δε.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of preferably ≦−0.5. It preferably comprises compounds of the formulae I, IIA, IIB and/or III.

The proportion of component A is preferably between 45 and 100%, in particular between 60 and 100%.

For component A, one (or more) individual compound(s) which has (have) a value of Δε of ≦−0.8 is (are) preferably selected. This value must be more negative the smaller the proportion A in the mixture as a whole.

Component B has pronounced nematogeneity and a flow viscosity of not greater than 30 mm²·s⁻¹, preferably not greater than 25 mm²·s⁻¹, at 20° C.

Particularly preferred individual compounds in component B are extremely low-viscosity nematic liquid crystals having a flow viscosity of not greater than 18 mm²·s⁻¹, preferably not greater than 12 mm²·s⁻¹, at 20° C.

Component B is monotropically or enantiotropically nematic and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

The phases preferably comprise 4 to 15, in particular 5 to 12, and particularly preferably <10, compounds of the formulae I, IIA and/or IIB and optionally III.

Besides compounds of the formulae I, IIA and/or IIB and III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

A preferred example of compounds which are suitable as constituents of liquid-crystal phases of this type can be characterized by the formula IV

R⁹-L-G-E-R¹⁰  IV in which L and E each denote a carbo- or heterocyclic ring system from the group formed by 1,4-disubstituted benzene and cyclohexane rings, 4,4'-disubstituted biphenyl, phenyl-cyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH=CH— —N(O)=N—
—CH—CQ— —CH=N(O)—
—C≡C— —CH₂—CH₂—
—CO—O— —CH₂—O—
—CO—S— —CH₂—S—
—CH=N— —COO-Phe—COO—
—CF₂O— —CF=CF—
—OCF₂— —OCH₂—
—(CH₂)₄— —(CH₂)₃O— or a C—C single bond, Q denotes halogen, preferably chlorine, or —CN, and R⁹ and R¹⁰ each denote alkyl, alkenyl, alkoxy, alkanoyloxy or alkoxycarbonyloxy having up to 18, preferably up to 8, carbon atoms, or one of these radicals alternatively denotes CN, NC, NO₂, NCS, CF₃, OCF₃, F, Cl or Br.

In most of these compounds, R⁹ and R¹⁰ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS, FFS or PALC mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

Besides the compounds of the formula I, the mixtures according to the invention preferably comprise one or more of the compounds shown below.

The following abbreviations are used: (n, m, z: each, independently of one another, 1, 2, 3, 4, 5 or 6)

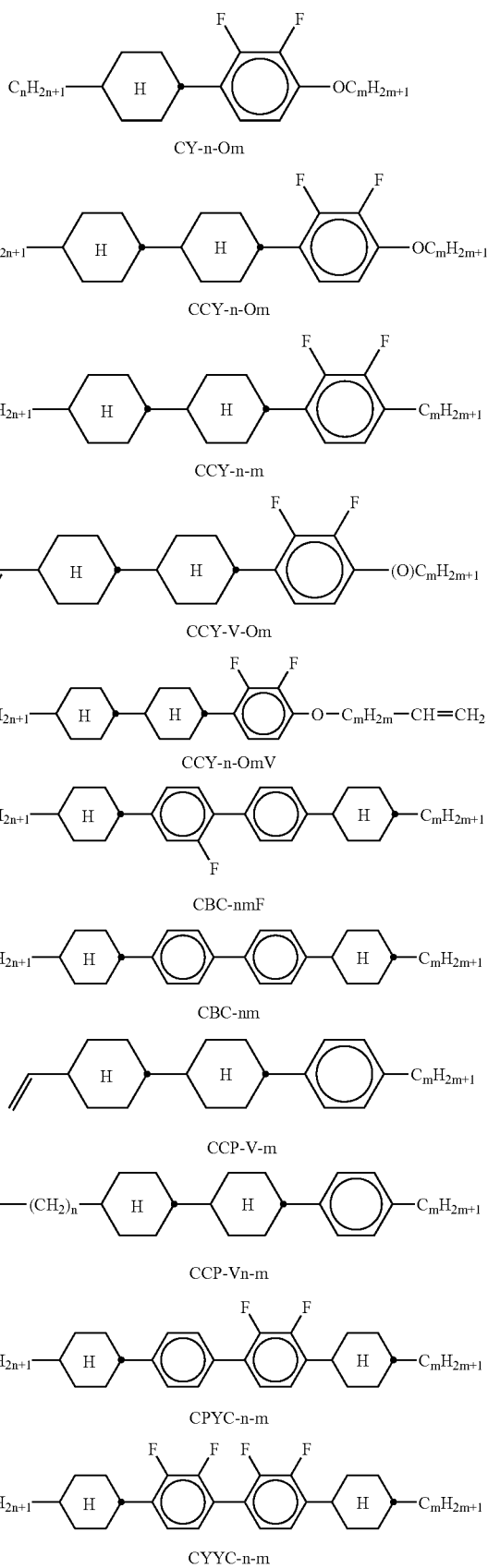

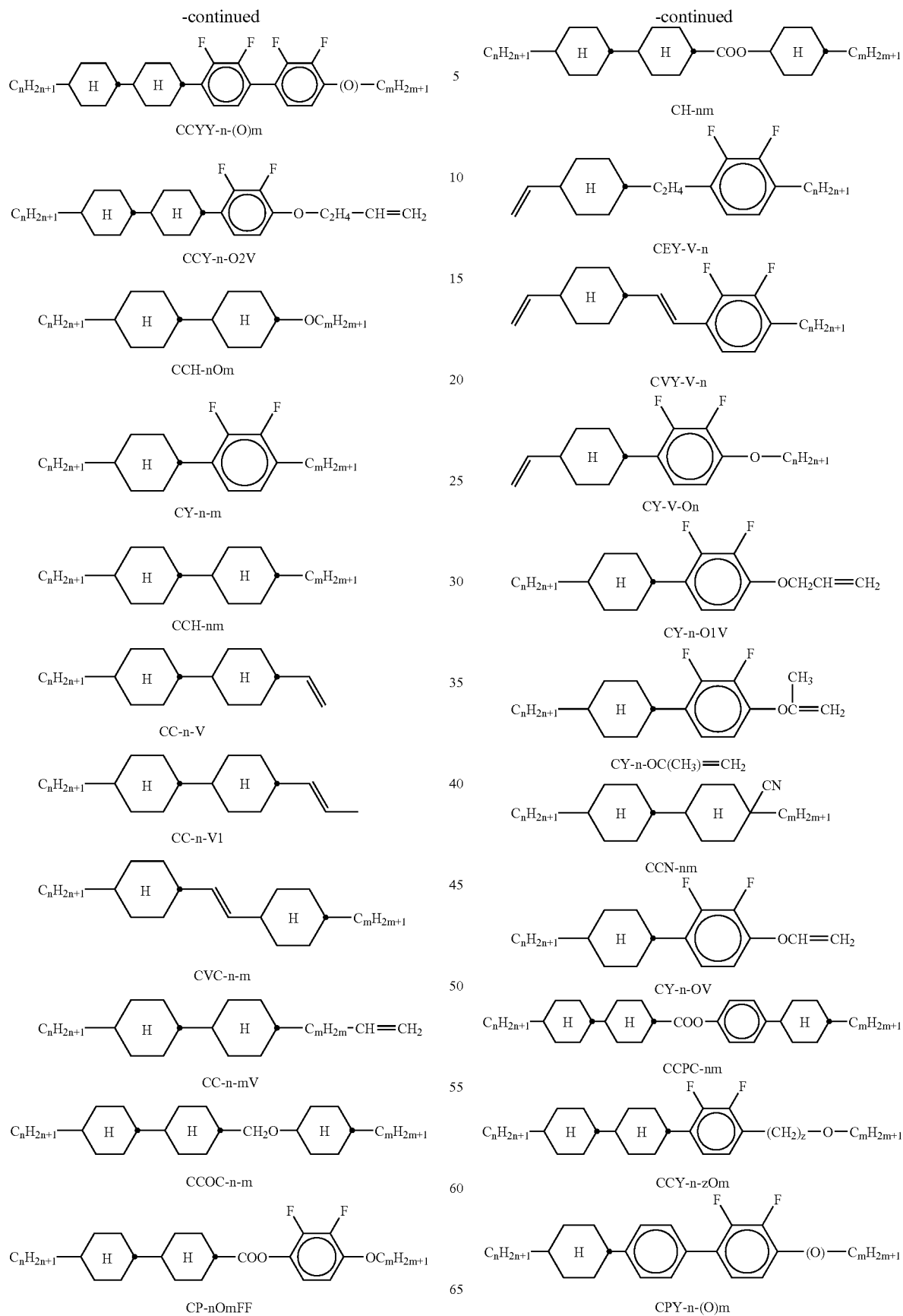

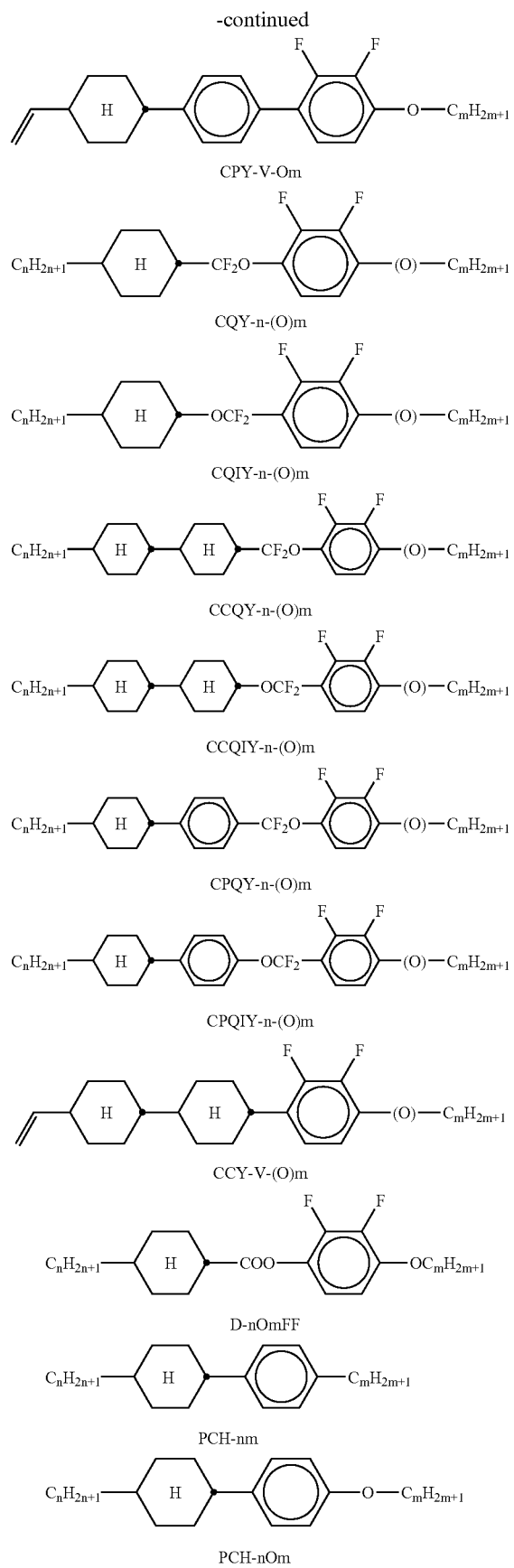
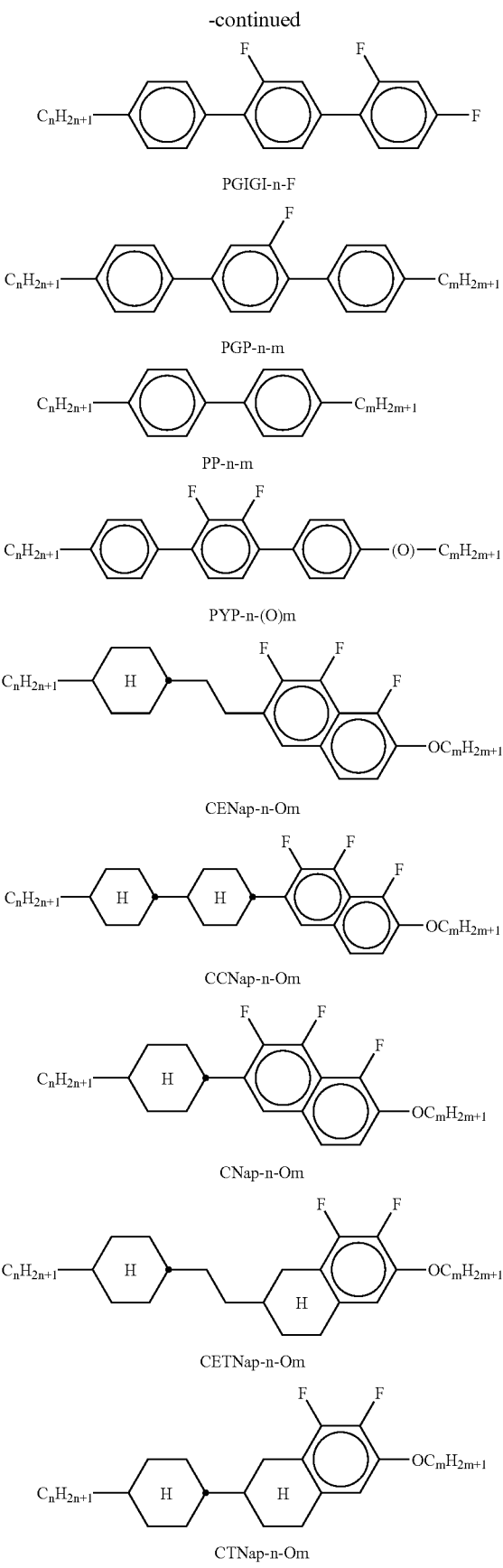

-continued

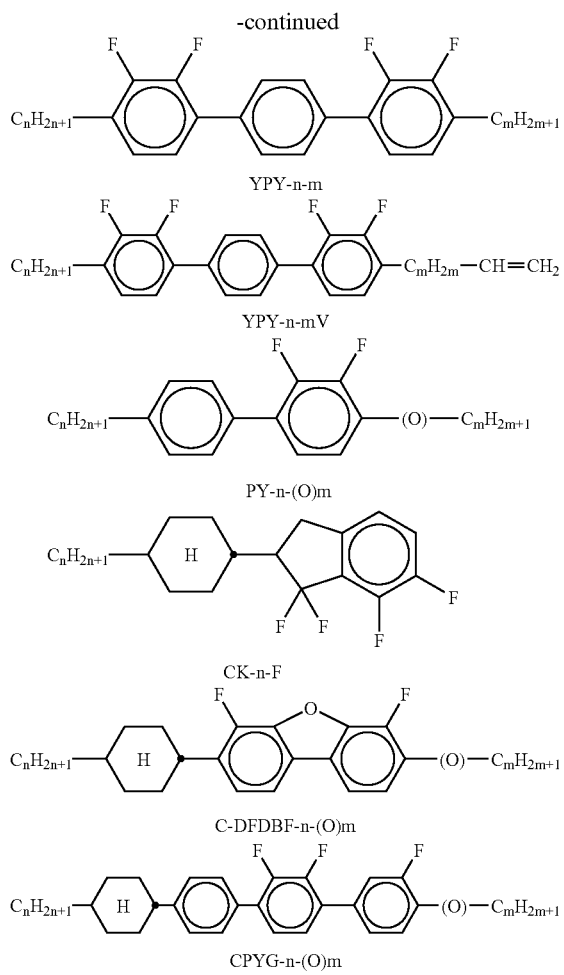

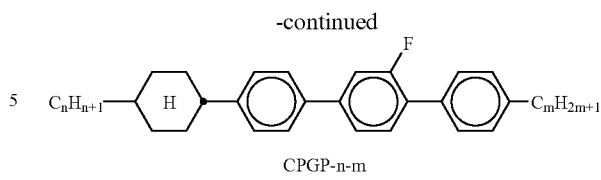

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV absorbers, antioxidants and free-radical scavengers. For example, 0-15% of pleochroic dyes, stabilisers or chiral dopants may be added.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table A shows possible dopants which can be added to the mixtures according to the invention. If the mixtures comprise a dopant, it is employed in amounts of preferably 0.014% by weight, more preferably 0.1-1.0% by weight.

TABLE A

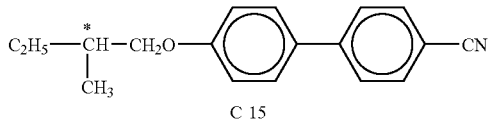
C 15

CB 15

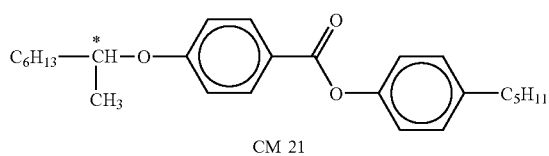
CM 21

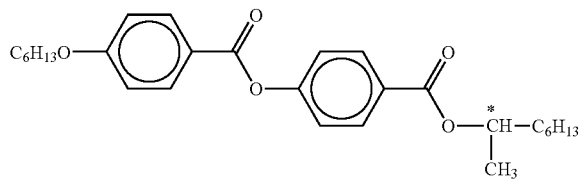
R/S-811

TABLE A-continued
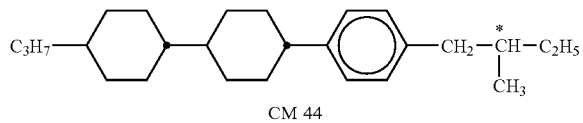
CM 44
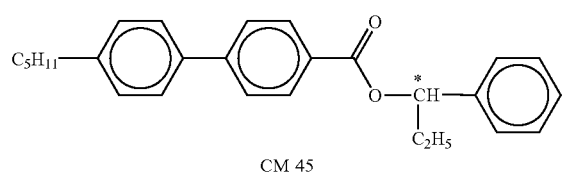
CM 45
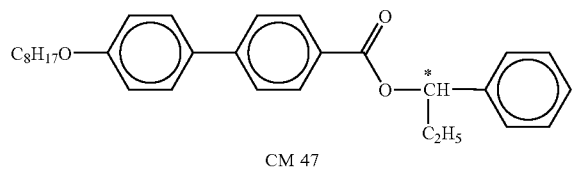
CM 47
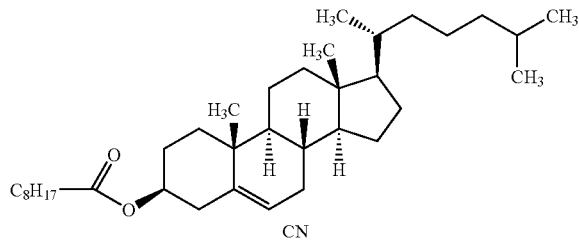
CN
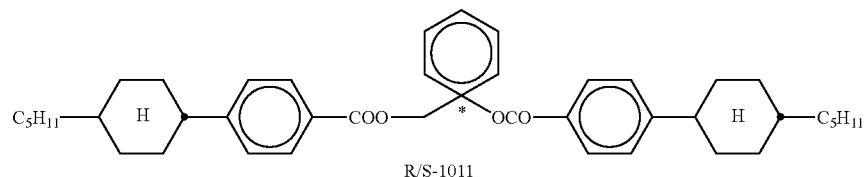
R/S-1011
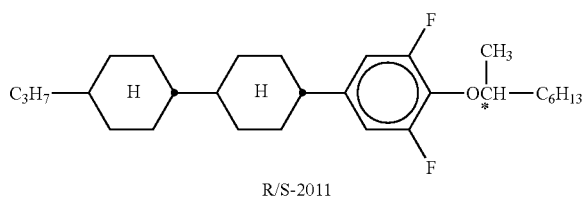
R/S-2011
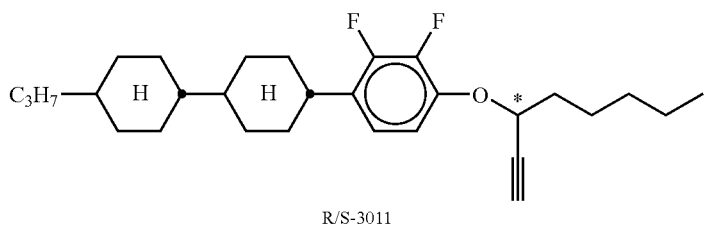
R/S-3011
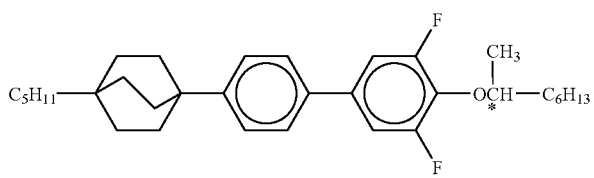

TABLE A-continued
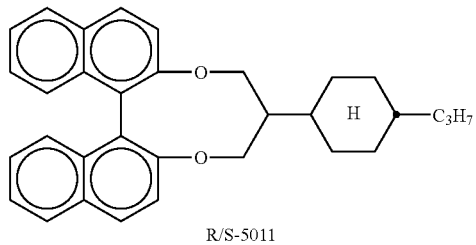
R/S-5011
Stabilizers which can be added, for example, to the mixtures according to the invention are shown below in Table B.
TABLE B
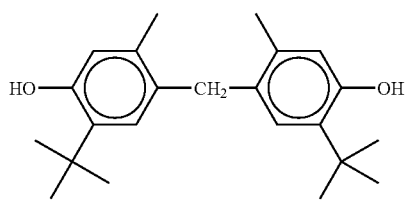
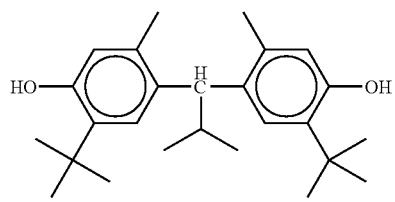
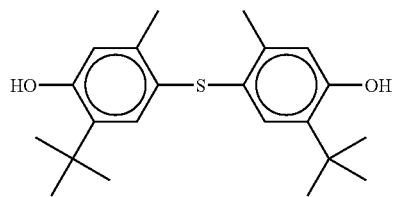
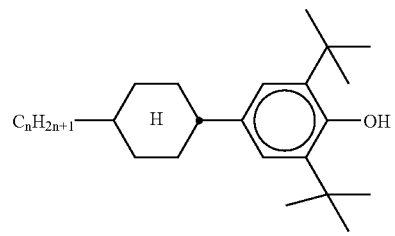
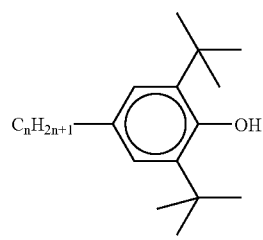

TABLE B-continued
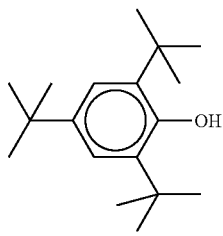
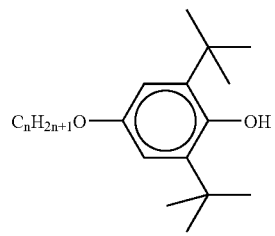
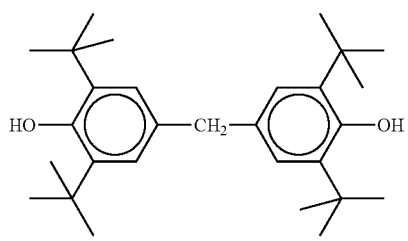
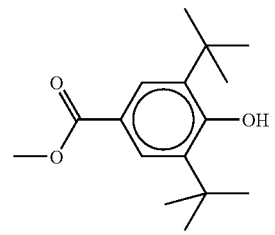
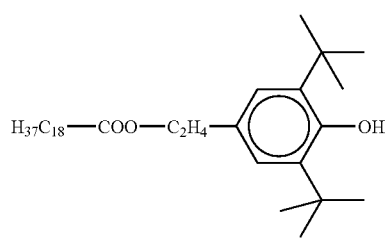
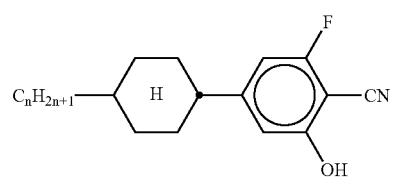

TABLE B-continued
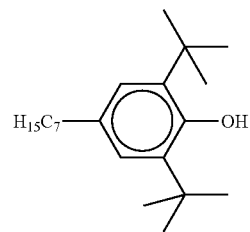
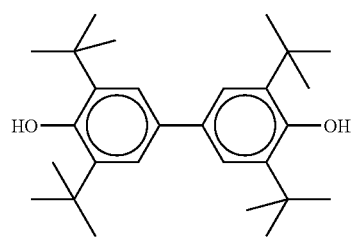
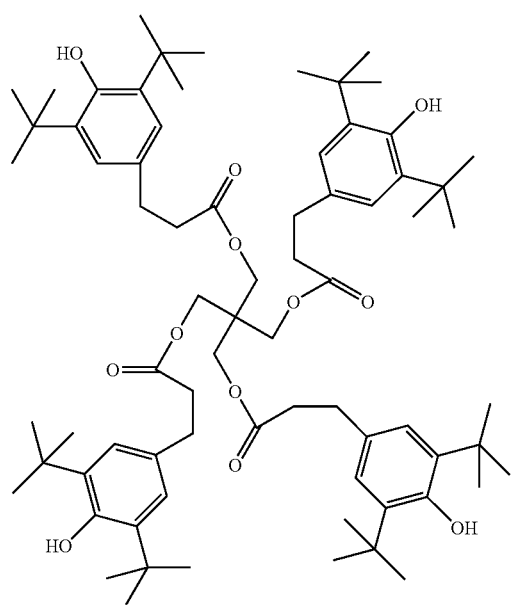
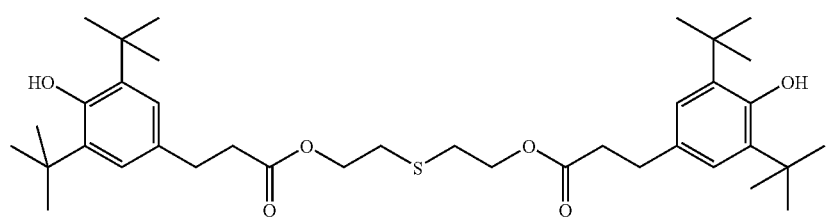

TABLE B-continued
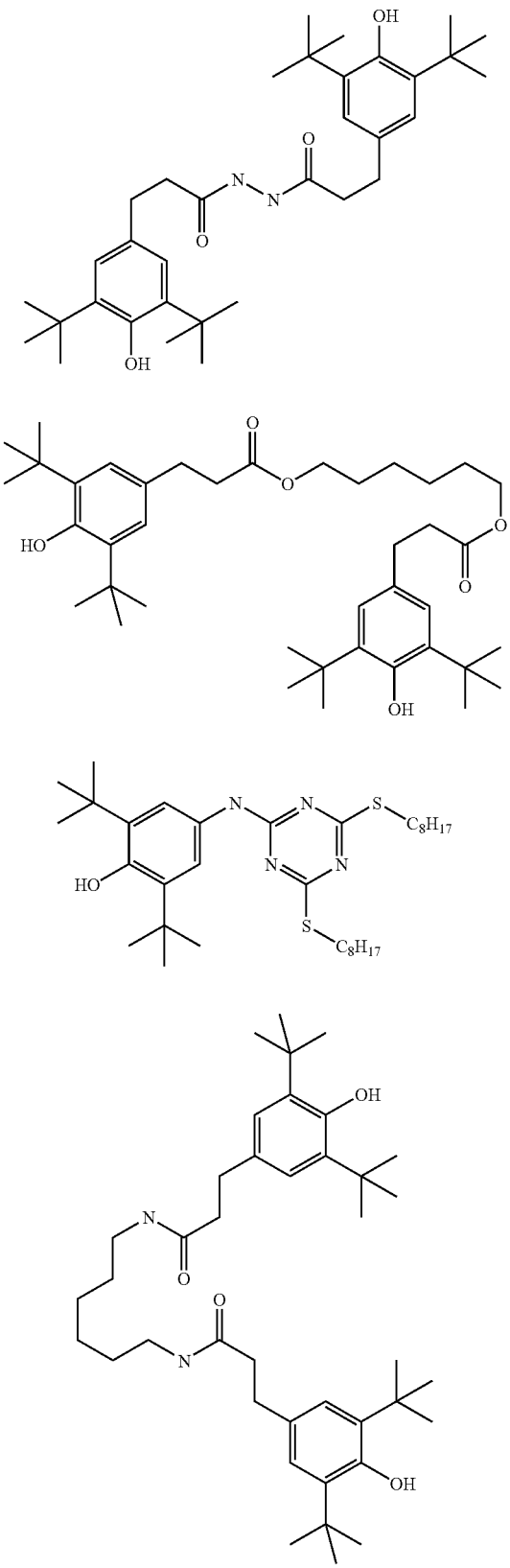

TABLE B-continued
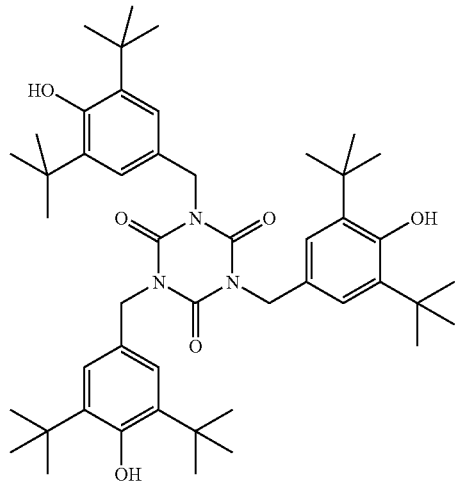
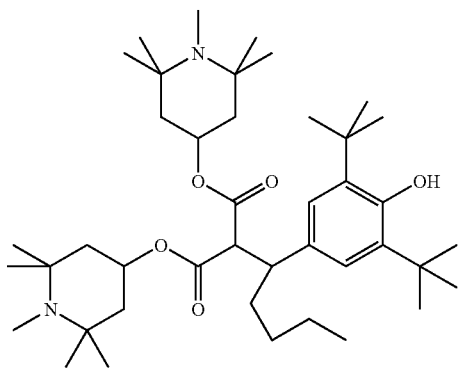
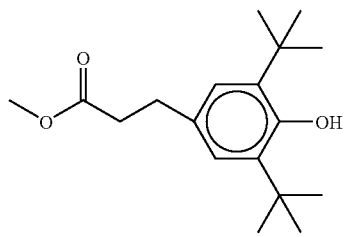
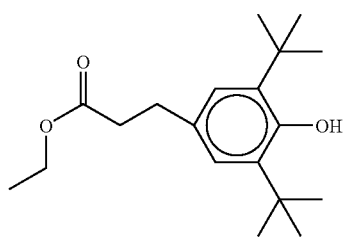
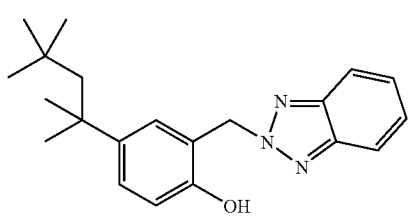

TABLE B-continued
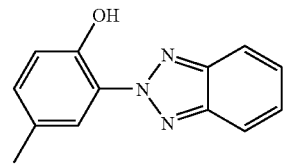
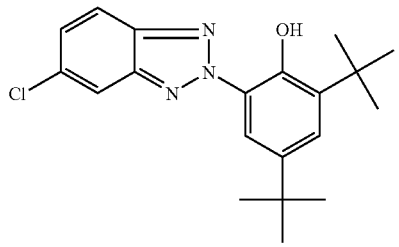
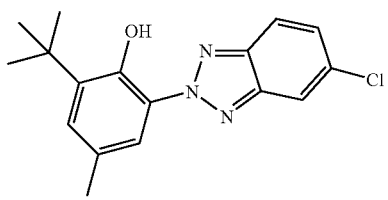
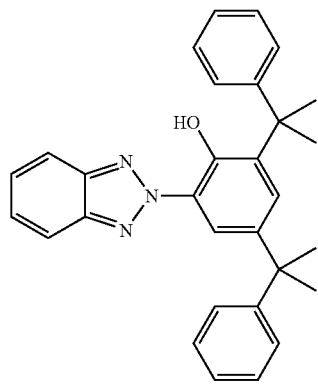
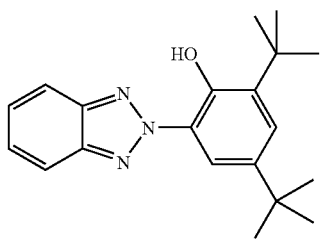
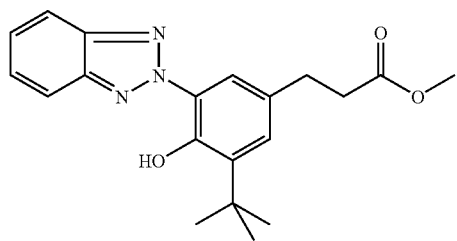

TABLE B-continued
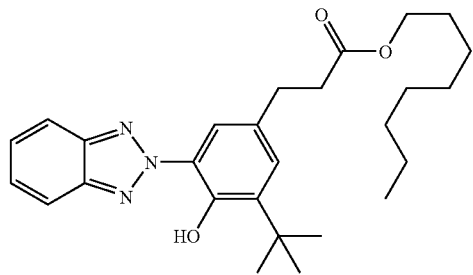
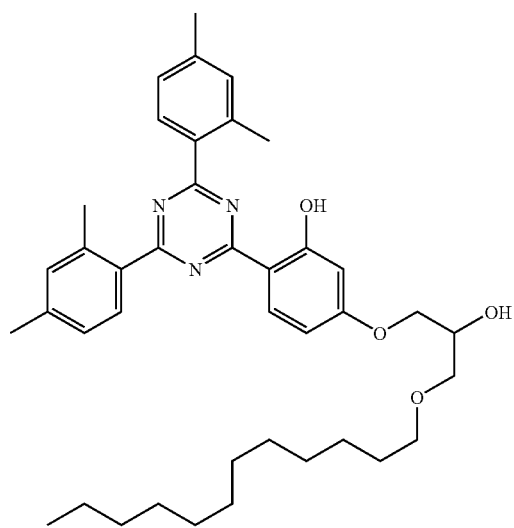
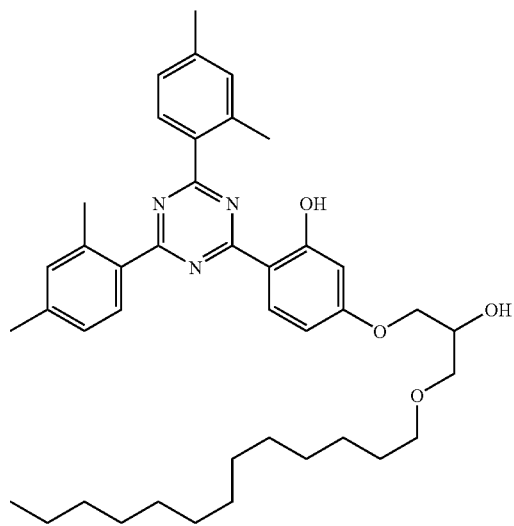

TABLE B-continued

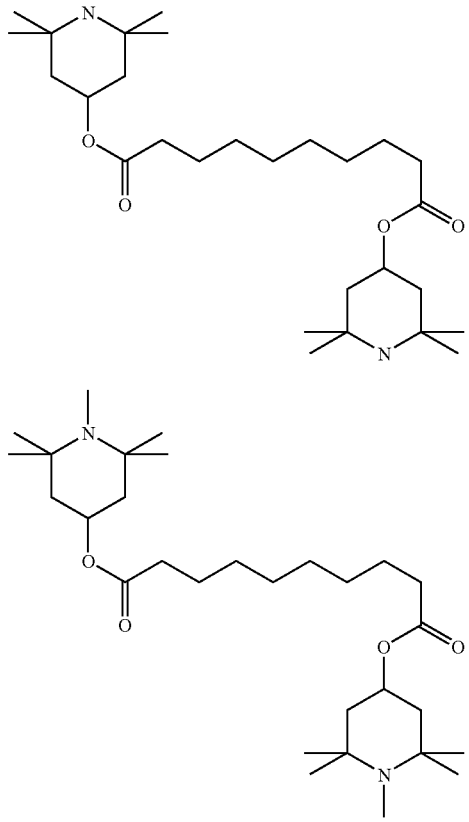

(n = 1–12)

The entire disclosures of all applicants, patents and publications, cited herein and of corresponding German application No. 102005038039.5, filed Aug. 9, 2005 are incorporated by reference herein.

The following examples are intended to explain the invention without limiting it. Above and below, percentages are by weight, temperatures are in ° C., and $V_0$ denotes the threshold voltage, capacitive [V] at 20° C.

$\Delta n$ denotes the optical anisotropy measured at 20° C. and 589 nm $\Delta \epsilon$ denotes the dielectric anisotropy at 20° C. and 1 kHz cl.p. denotes the clearing point [° C.]

$\gamma_1$ denotes the rotational viscosity measured at 20° C. [mPa·s]

$K_1$ denotes the elastic constant, "splay" deformation at 20° C. [pN]

$K_3$ denotes the elastic constant, "bend" deformation at 20° C. [pN]

LTS denotes the low-temperature stability (nematic phase), determined in test cells The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

MIXTURE EXAMPLES

Example 1

| | | | |
|---|---|---|---|
| CY-3-O4 | 19.00% | Clearing point [° C.]: | +95.0 |
| CY-5-O2 | 12.00% | Δn [589 nm, 20° C.]: | +0.1115 |
| CCY-3-O2 | 11.00% | Δε [1 kHz, 20° C.]: | −7.2 |
| CCY-3-O3 | 12.00% | $K_1$ [pN, 20° C.]: | 14.5 |
| CCY-4-O2 | 12.00% | $K_3$ [pN, 20° C.]: | 16.2 |
| CPY-2-O2 | 12.00% | $\gamma_1$ [mPa · s, 20° C.]: | 317 |
| CPY-3-O2 | 3.00% | $V_0$ [V]: | 1.58 |
| CC-4-V | 9.00% | | |

-continued

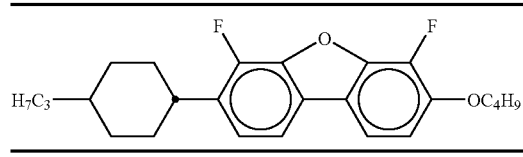

10.00%

Example 2

| | | | |
|---|---|---|---|
| CY-3-O4 | 16.00% | Clearing point [° C.]: | +95.0 |
| CCY-3-O3 | 11.00% | Δn [589 nm, 20° C.]: | +0.1164 |
| CCY-4-O2 | 10.00% | Δε [1 kHz, 20° C.]: | −7.3 |
| CPY-2-O2 | 12.00% | $K_1$ [pN, 20° C.]: | 14.0 |
| CPY-3-O2 | 11.00% | $K_3$ [pN, 20° C.]: | 15.3 |
| CC-4-V | 13.00% | $\gamma_1$ [mPa · s, 20° C.]: | |
| PYP-2-3 | 2.00% | $V_0$ [V]: | 1.53 |

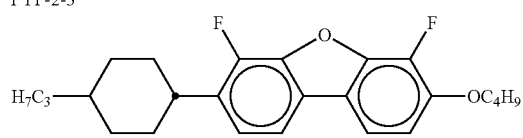 10.00%

| CK-3-F | 4.00% |
|---|---|
| CK-4-F | 7.00% |
| CK-5-F | 4.00% |

Example 3

| | | | |
|---|---|---|---|
| CY-3-O2 | 18.00% | Clearing point [° C.]: | +78.5 |
| CCY-3-O2 | 7.00% | Δn [589 nm, 20° C.]: | +0.0834 |
| CCY-3-O3 | 13.00% | Δε [1 kHz, 20° C.]: | −3.5 |
| CCY-4-O2 | 10.00% | $K_1$ [pN, 20° C.]: | 12.9 |
| CCPY-2-O2 | 5.00% | $K_3$ [pN, 20° C.]: | 14.8 |
| CC-3-V | 42.00% | $\gamma_1$ [mPa · s, 20° C.]: | 93 |
| | 5.00% | $V_0$ [V]: | 2.18 |

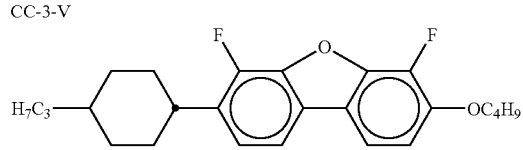

Example 4

| | | | |
|---|---|---|---|
| CY-3-O2 | 4.00% | Clearing point [° C.]: | +75.0 |
| PYP-2-3 | 7.00% | Δn [589 nm, 20° C.]: | +0.1031 |
| CPY-2-O2 | 12.00% | Δε [1 kHz, 20° C.]: | −2.3 |
| CC-3-V | 57.00% | $K_1$ [pN, 20° C.]: | 12.9 |
| | 20.00% | $K_3$ [pN, 20° C.]: | 13.1 |

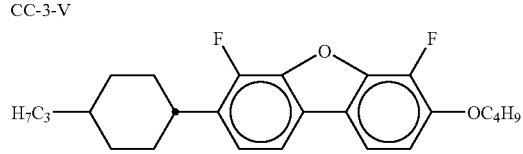

| | | |
|---|---|---|
| | $\gamma_1$ [mPa · s, 20° C.]: | 68 |
| | $V_0$ [V]: | 2.50 |

Example 5

| | | | |
|---|---|---|---|
| CY-3-O2 | 6.00% | Clearing point [° C.]: | +74.0 |
| CCY-3-O2 | 4.00% | Δn [589 nm, 20° C.]: | +0.0923 |
| CPY-2-O2 | 10.00% | Δε [1 kHz, 20° C.]: | −2.4 |
| CPY-3-O2 | 4.00% | $\gamma_1$ [mPa · s, 20° C.]: | 68 |
| CC-3-V | 58.00% | $V_0$ [V]: | 2.41 |
| | 18.00% | | |

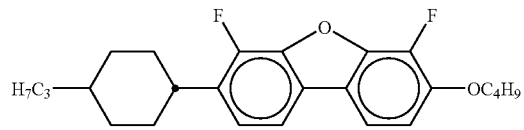

Example 6

| | | | |
|---|---|---|---|
| CY-3-O4 | 15.00% | Clearing point [° C.]: | +94.5 |
| CCY-3-O2 | 7.00% | Δn [589 nm, 20° C.]: | +0.1103 |
| CCY-3-O3 | 12.00% | Δε [1 kHz, 20° C.]: | −7.0 |
| CCY-4-O2 | 12.00% | $\gamma_1$ [mPa · s, 20° C.]: | 310 |
| CPY-2-O2 | 12.00% | | |
| CC-4-V | 18.00% | | |
| | 10.00% | | |

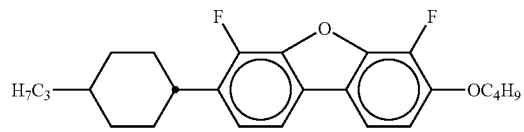

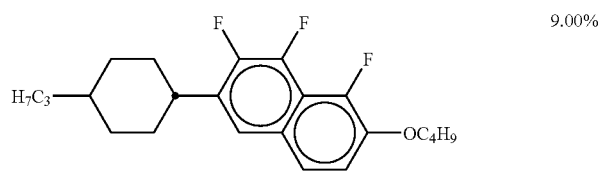

9.00%

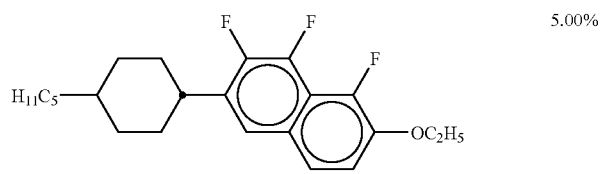

5.00%

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Liquid-crystalline medium based on a mixture of polar compounds which comprises at least one compound of the formula I

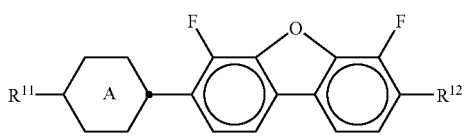

in which
$R^{11}$ and $R^{12}$ each, independently of one another, denote H, an alkyl or alkenyl radical having 1 to 15 C atoms which is unsubstituted, monosubstituted by CN or CF$_3$ or monosubstituted to perhalo-substituted by halogen, where, in addition, one or more CH$_2$ groups in these radicals are optionally replaced by —O—, —S—,

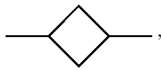

—C≡C—, —CF₂O—, —OCF₂—, —OC—O— or —O—CO— in such a way that O atoms are not linked directly to one another,

denotes
- a) a 1,4-cyclohexenylene or 1,4-cyclohexylene radical, in which one or two non-adjacent CH₂ groups are optionally replaced by —O— or —S—,
- b) a 1,4-phenylene radical, in which one or two CH groups are optionally replaced by N,
- c) a radical from the group consisting of piperidine-1,4-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) are optionally mono-or polysubstituted by halogen atoms;

and further comprises one or more compounds of the formulae IIA and/or IIB

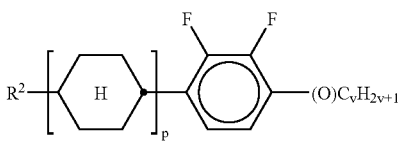   IIA

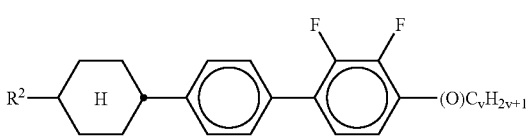   IIB in which
R² denotes an alkyl or alkenyl radical having 1 to 15 C atoms which is unsubstituted, monosubstituted by CN or CF₃ or monosubstituted to perhalo-substituted by halogen, where, one or more CH₂ groups in these radicals are optionally, independently of one another, replaced by —O—, —S—,

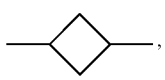

—C≡C—, —CO—, —CO—O—, —O—CO— or —O—CO—O— in such a way that O atoms are not linked directly to one another,
p denotes 1 or 2, and
v denotes 1 to 6.

2. A liquid-crystalline medium based on a mixture of polar compounds which comprises at least one compound of the formula I

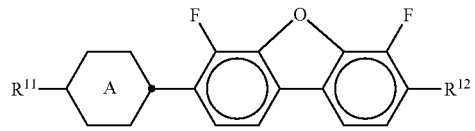   I in which
R¹¹ and R¹² each, independently of one another, denote H, an alkyl or alkenyl radical having 1 to 15 C atoms which is unsubstituted monosubstituted by CN or CF₃ or mono-substituted to perhalo-substituted by halogen, where, in addition, one or more CH₂ groups in these radicals are optionally replaced by —O—, —S—,

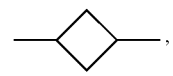

—C≡C—, —CF₂O—, —OCF₂—, —OC—O— or —O—CO— in such a way that O atoms are not linked directly to one another,

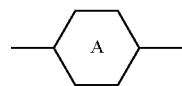

denotes
- a) a 1,4-cyclohexenylene or 1,4-cyclohexylene radical, in which one or two non-adjacent CH₂ groups are optionally replaced by —O— or —S—,
- b) a 1,4-phenylene radical, in which one or two CH groups are optionally replaced by N,
- c) a radical from the group consisting of piperidine-1,4-diyl, 1,4-bicyclo[2.2.2] octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) are optionally mono- or polysubstituted by halogen atoms, and which additionally comprises one or more compounds of the formula III

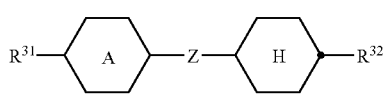   III in which
R³¹ and R³² each, independently of one another, denote a straight-chain alkyl, alkenyl, alkoxyalkyl or alkoxy radical having 1 to 12 C atoms,

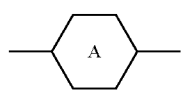 denotes 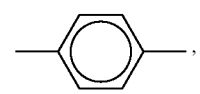

-continued

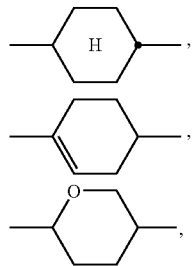

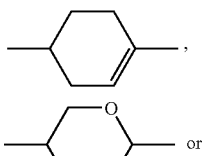

Z denotes a single bond, —CH₂CH₂—, —CH=CH—, —CF₂O—, —OCF₂—, —CH₂O—, —OCH₂—, —COO—, —OCO—, —C₂F₄— or —CF=CF—.

3. A liquid-crystalline medium according to claim 1, which additionally comprises one or more compounds of the formula III

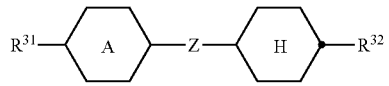 III in which

R³¹ and R³² each, independently of one another, denote a straight-chain alkyl, alkenyl, alkoxyalkyl or alkoxy radical having 1 to 12 C atoms,

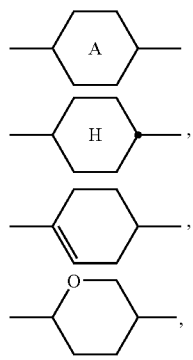

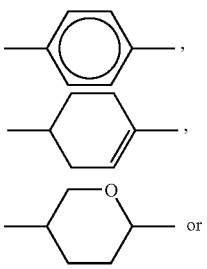

Z denotes a single bond, —CH₂CH₂—, —CH=CH—, —CF₂O—, —OCF₂—, —CH₂O—, —OCH₂—, —COO—, —OCO—, —C₂F₄— or —CF=CF—.

4. A liquid-crystalline medium according to claim 1, which comprises two or more compounds of the formula I.

5. A liquid-crystalline medium according to of claim 1, wherein the proportion of compounds of the formula I in the mixture as a whole is at least 2% by weight.

6. A liquid-crystalline medium according to claim 1, wherein the proportion of compounds of the formulae IIA and/or IIB in the mixture as a whole is at least 20% by weight.

7. A liquid-crystalline medium according to claim 2, wherein the proportion of compounds of the formula III in the mixture as a whole is at least 3% by weight.

8. A liquid-crystalline medium according to claim 1, which comprises at least one compound selected from the formulae I1 to I9

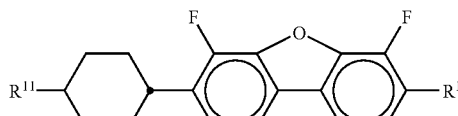 I1

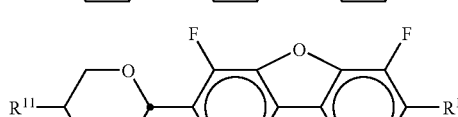 I2

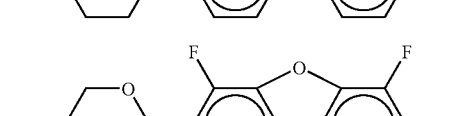 I3

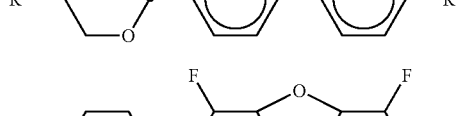 I4

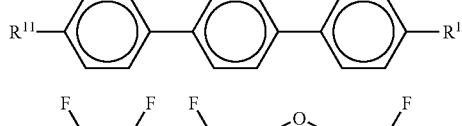 I5

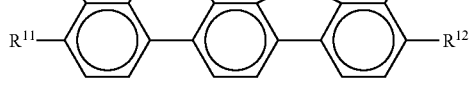 I6

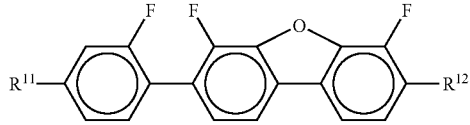 I7

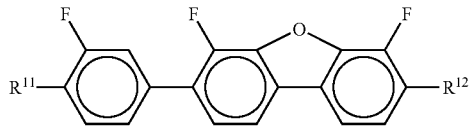 I8

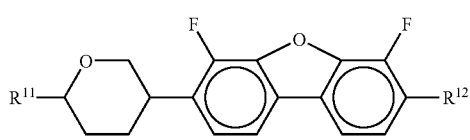 I9 in which

R¹¹ has the meanings indicated in claim 1.

9. A liquid-crystalline medium according to claim 1, which comprises
- 2-20% by weight of one or more compounds of the formula I and
- 20-80% by weight of one or more compounds of the formulae IIA and/or IIB,
- where the total amount of the compounds of the formulae I and IIA and/or IIB is ≦100% by weight.

10. An electro-optical display with active-matrix addressing based on the VA, ECB, PALC, FFS or IPS effect, which contains, as dielectric, a liquid-crystalline medium according to claim 1.

11. A liquid-crystalline medium according to claim 2, which comprises at least one compound selected from the formulae I1 to I9

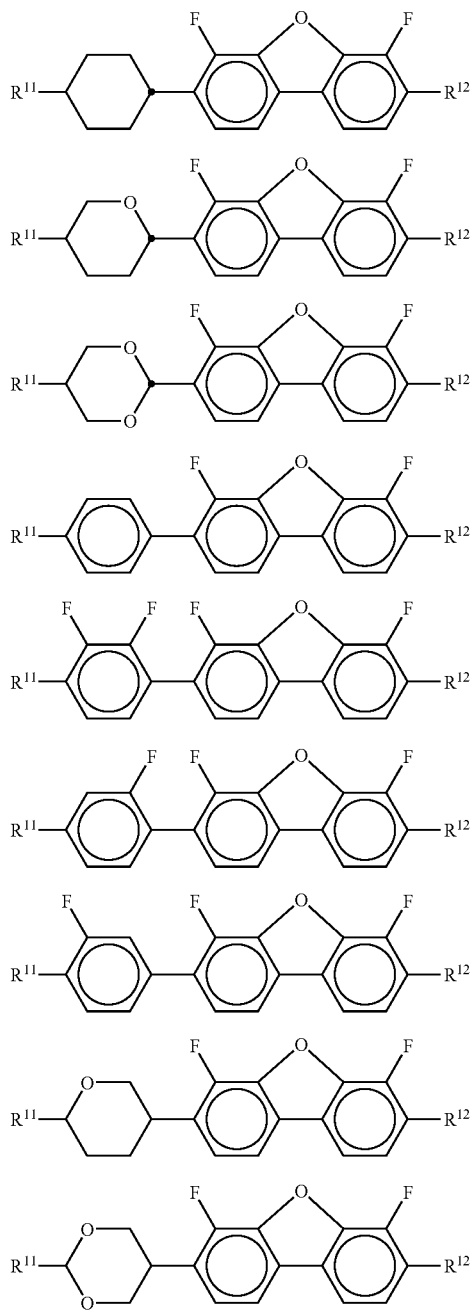

in which $R^{11}$ has the meanings indicated in claim 2.

12. An electro-optical display with active-matrix addressing based on the VA, ECB, PALC, FFS or IPS effect, which contains, as dielectric, a liquid-crystalline medium according claim 2.

13. Liquid-crystalline medium according to claim 1, which additionally comprises one or more fluorinated terphenyls of the formulae T-1 to T-22:

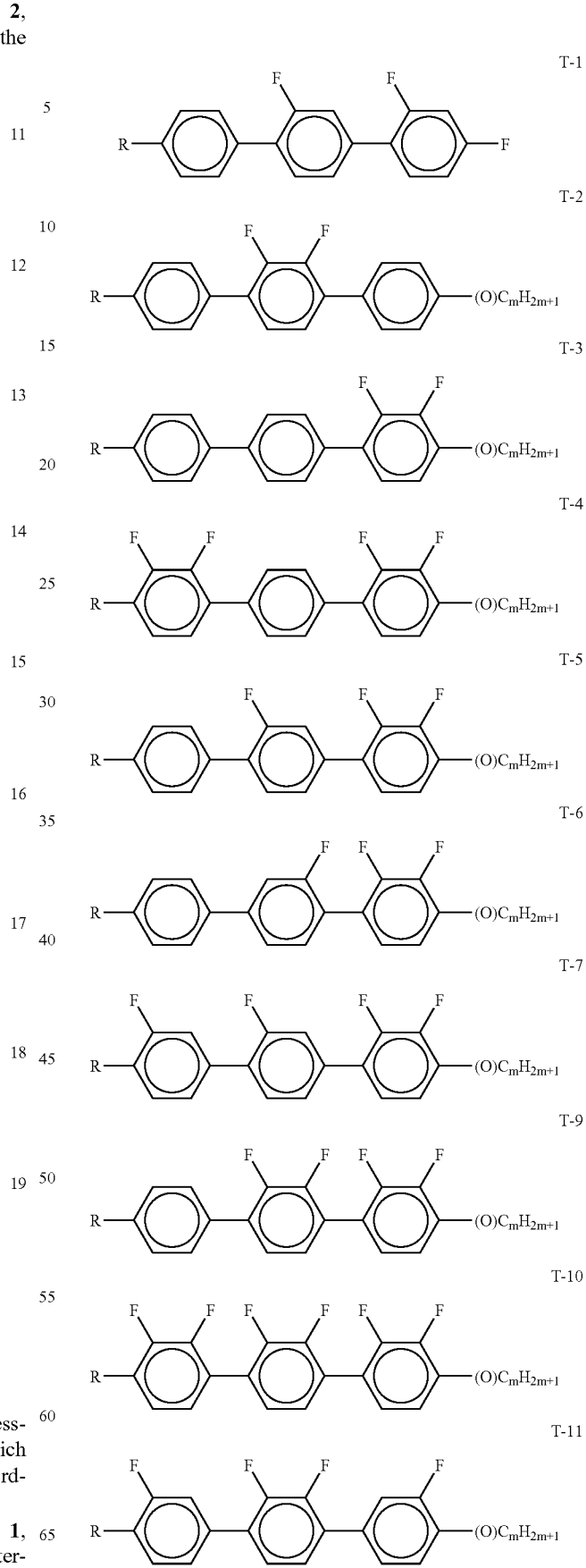

-continued
T-12
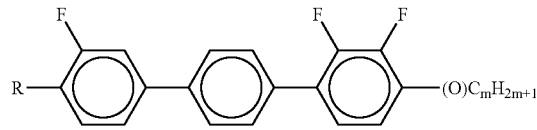
T-13
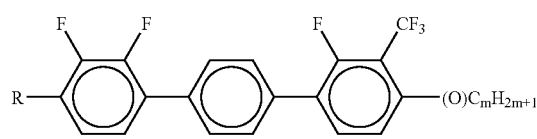
T-14
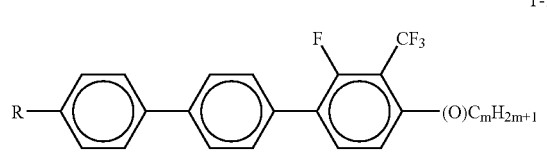
T-15
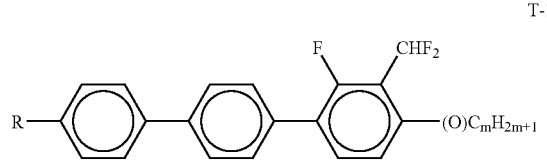
T-16
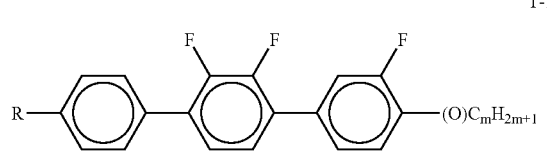
T-17
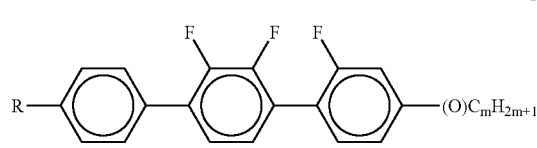
T-18
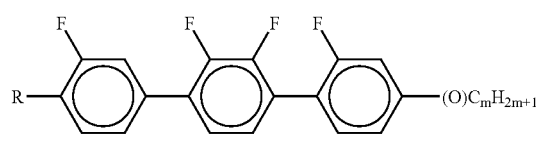
T-19
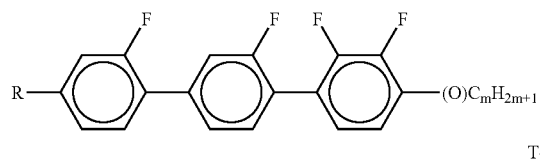
T-20
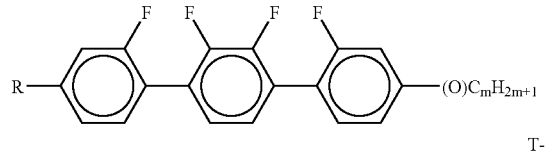
T-21
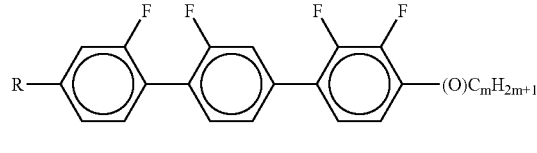
-continued
T-22
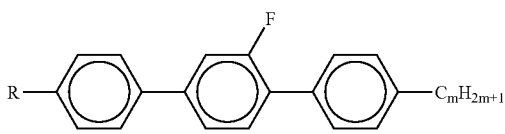
in which
R has the meanings indicated for $R^{11}$ in claim 1, m is from 1-6 and (O) is O or a direct bond.
14. Liquid-crystalline medium according to claim 2, which additionally comprises one or more fluorinated terphenyls of the formulae T-1 to T-22:
T-1
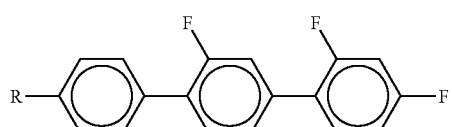
T-2
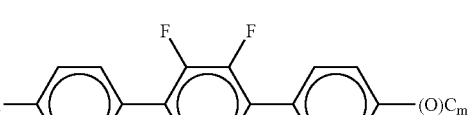
T-3
T-4
T-5
T-6
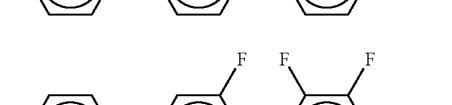
T-7
T-9
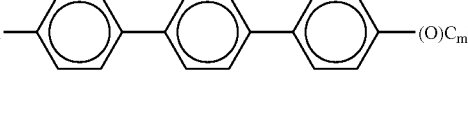

-continued

T-10
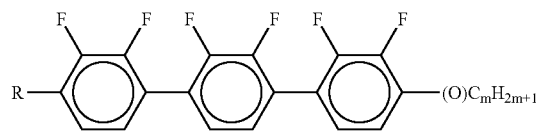

T-11
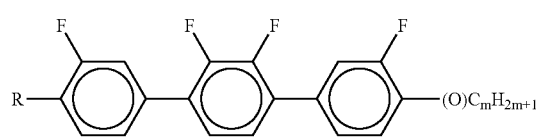

T-12
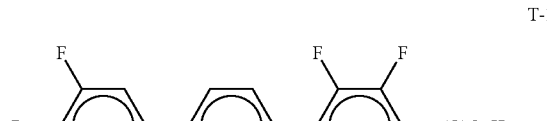

T-13

T-14
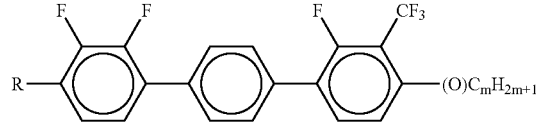

T-15
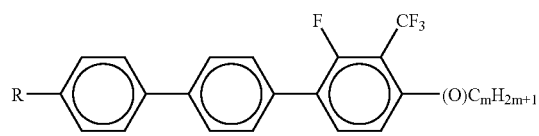

T-16
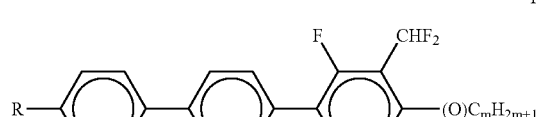

T-17
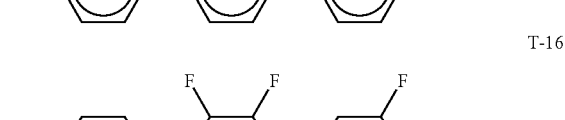

T-18
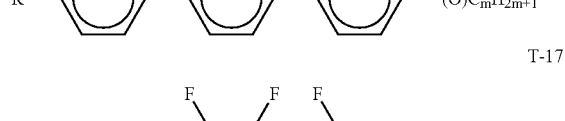

T-19
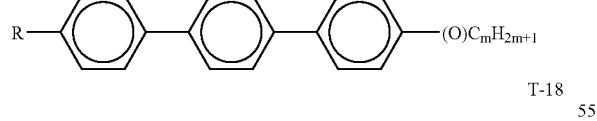

-continued

T-20
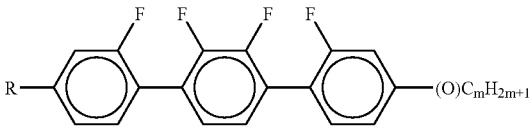

T-21
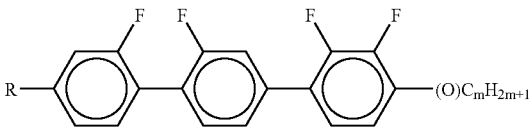

T-22
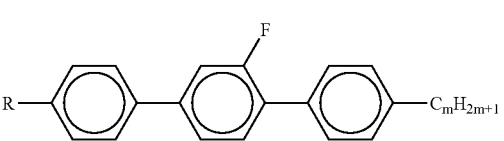

in which

R has the meanings indicated for $R^{11}$ in claim 2, m is from 1-6 and (O) is O or a direct bond.

15. Liquid-crystalline medium according to claim 1, which additionally comprises one or more compounds of the following formulae:

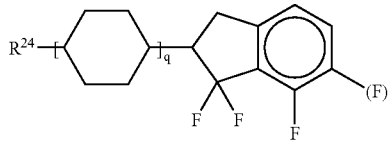

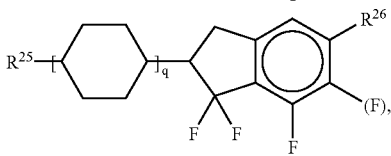

where $R^{24}$ and $R^{25}$ have the meanings indicated for $R^{11}$ in claim 1, $R^{26}$ denotes $CH_3$, $C_2H_5$ or n-$C_3H_7$, q denotes 1 or 2 and (F) is F or H.

16. Liquid-crystalline medium according to claim 2, which additionally comprises one or more compounds of the following formulae:

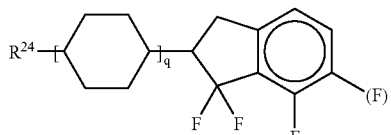

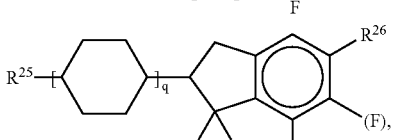

where
$R^{24}$ and $R^{25}$ have the meanings indicated for $R^{11}$ in claim 2, $R^{26}$ denotes $CH_3$, $C_2H_5$ or $n$-$C_3H_7$, q denotes 1 or 2 and (F) is F or H.
17. Liquid-crystalline medium according to claim 1, which additionally comprises at least one compound of the formulae Z-1 to Z-21:
Z-1
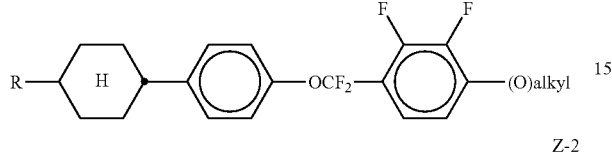
Z-2
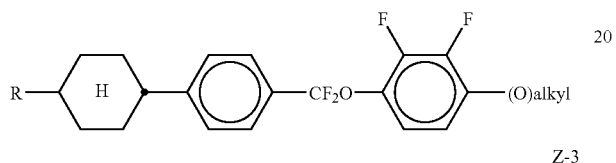
Z-3
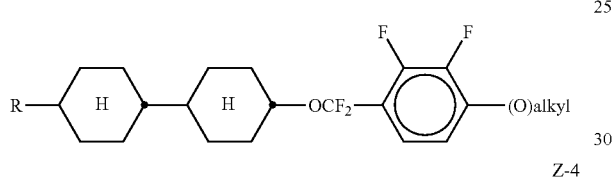
Z-4
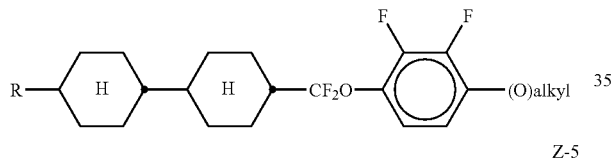
Z-5
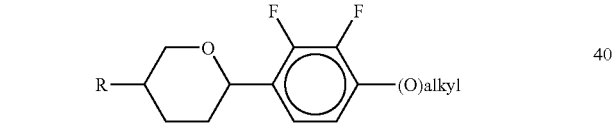
Z-6
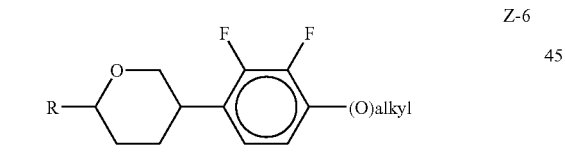
Z-7
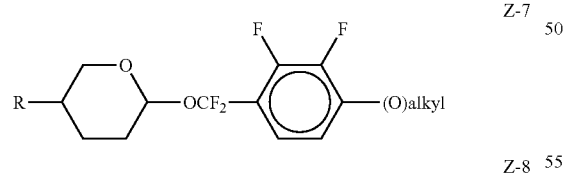
Z-8
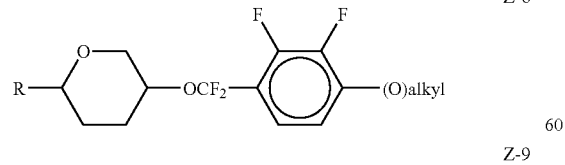
Z-9
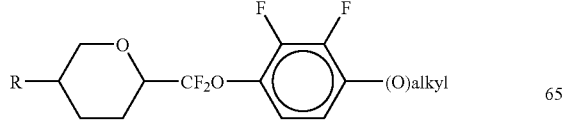
-continued
Z-10
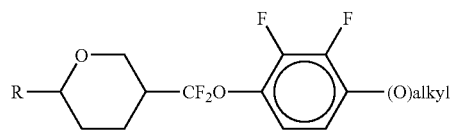
Z-11
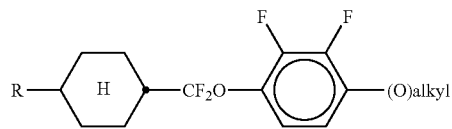
Z-12
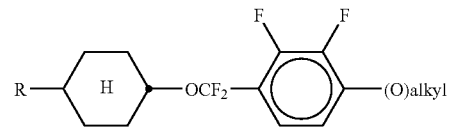
Z-13
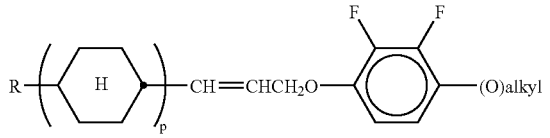
Z-14
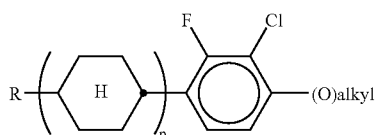
Z-15
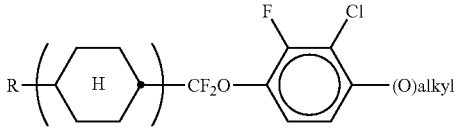
Z-16
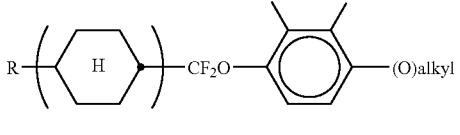
Z-17
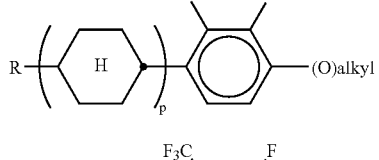
Z-18
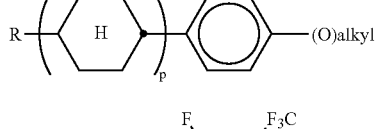
Z-19
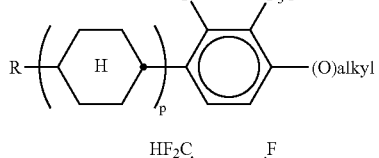
Z-20

-continued
Z-21
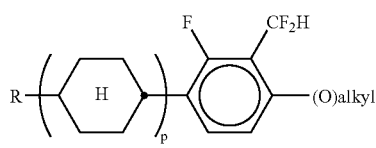
in which:
R denotes alkyl or alkoxy having 1 to 6 C atoms or alkenyl, alkoxyalkyl, or alkenyloxy having 2 to 6 C atoms,
alkyl is a straight-chain alkyl radical having 1-6 C atoms,
(O) is O or a direct bond, and
p is 1 or 2.
18. Liquid-crystalline medium according to claim 2, which additionally comprises at least one compound of the formulae Z-1 to Z-21:
Z-1
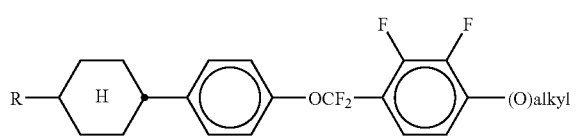
Z-2
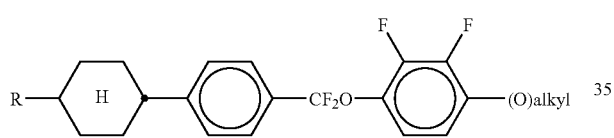
Z-3
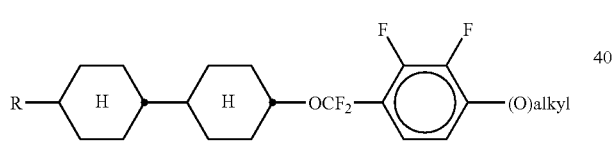
Z-4
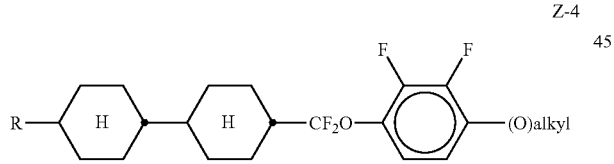
Z-5
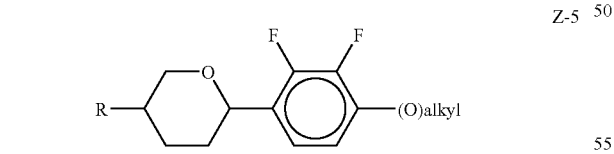
Z-6
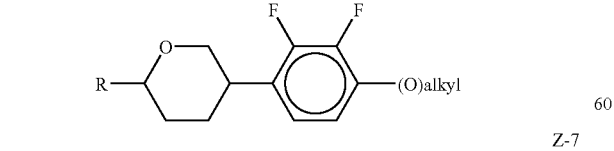
Z-7
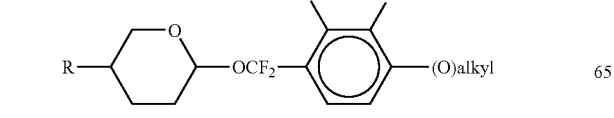
-continued
Z-8
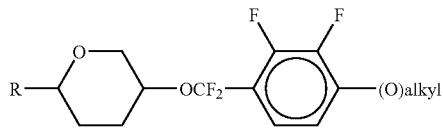
Z-9
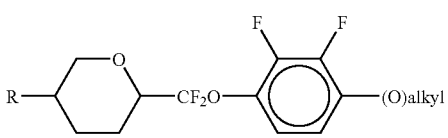
Z-10
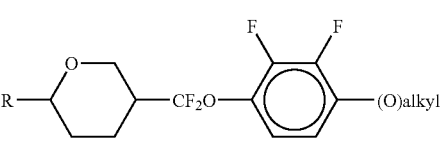
Z-11
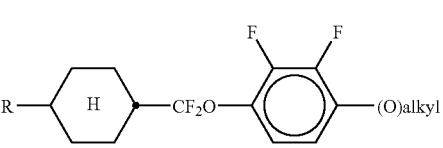
Z-12
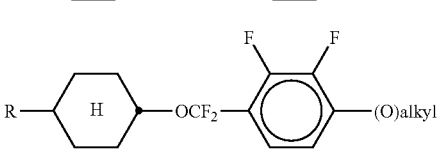
Z-13
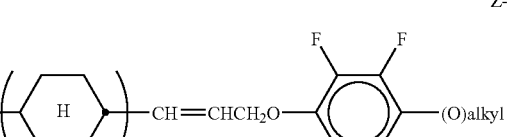
Z-14
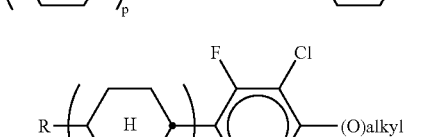
Z-15
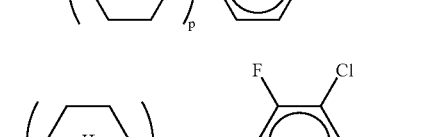
Z-16
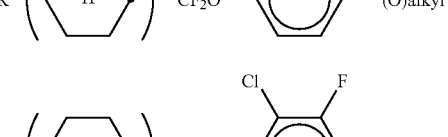
Z-17
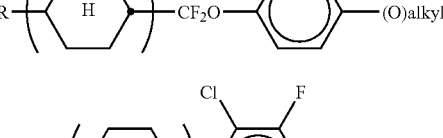
Z-18
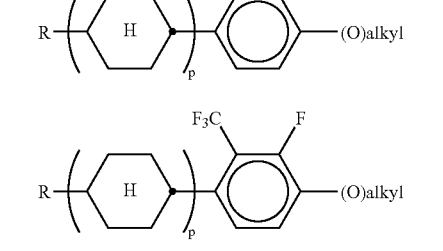

-continued

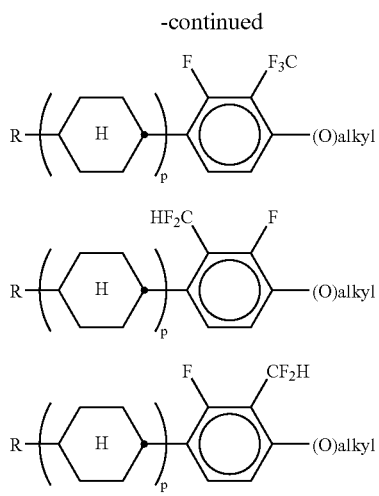

in which:
R denotes alkyl or alkoxy having 1 to 6 C atoms or alkenyl, alkoxyalkyl, or alkenyloxy having 2 to 6 C atoms,
alkyl is a straight-chain alkyl radical having 1-6 C atoms,
(O) is O or a direct bond, and
p is 1 or 2.

19. Liquid-crystalline medium according to claim 1, further comprising at least one compound of the formulae O-1 to O-12:

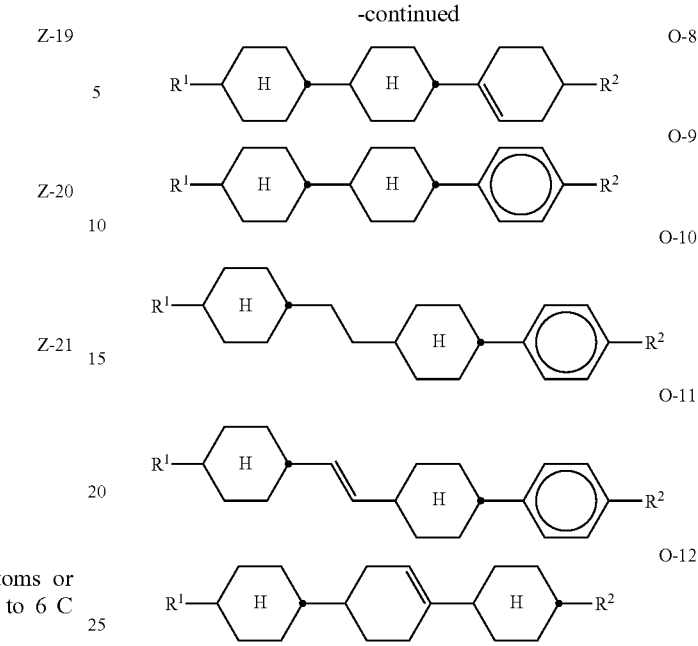

in which $R^1$ and $R^2$ independently have one of the meanings indicated for $R^{11}$ in claim 1.

20. Liquid-crystalline medium according to claim 2, further comprising at least one compound of the formulae O-1 to O-12:

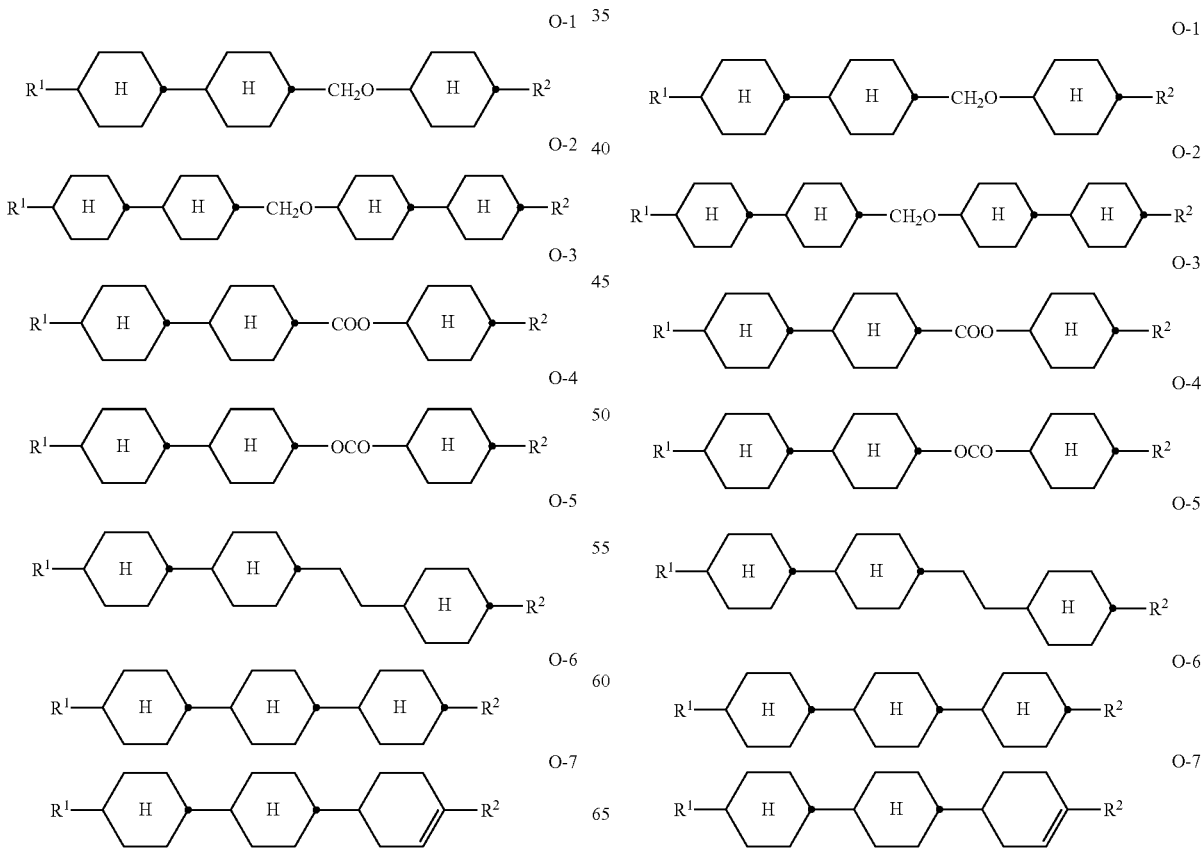

-continued

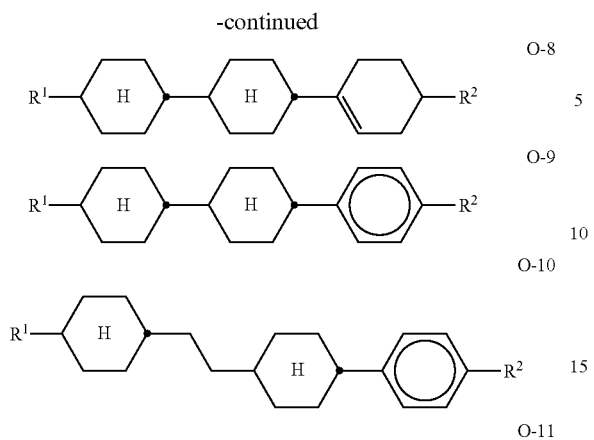

O-8
O-9
O-10
O-11
O-12 in which $R^1$ and $R^2$ independently have one of the meanings indicated for $R^{11}$ in claim 2.

21. Liquid-crystalline medium according to claim 1, further comprising at least one stabilizer of one of the following formulae:

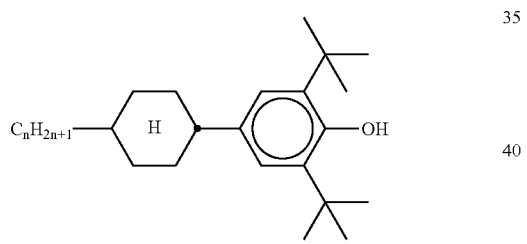

-continued

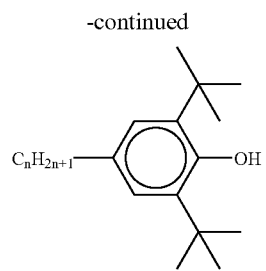

where n is from 1 to 6.

22. Liquid-crystalline medium according to claim 2, further comprising at least one stabilizer of one of the following formulae:

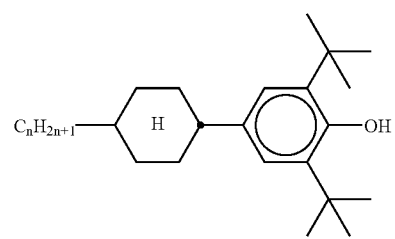

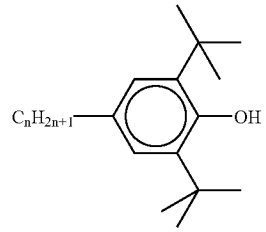

where n is from 1 to 6.

* * * * *